United States Patent
Price et al.

(10) Patent No.: US 11,737,189 B1
(45) Date of Patent: Aug. 22, 2023

(54) STARTUP CURRENT CONTROL METHOD FOR FLYBACK CONVERTER

(71) Applicant: Universal Lighting Technologies, Inc., Madison, AL (US)

(72) Inventors: Scott Price, Madison, AL (US); Wei Xiong, Madison, AL (US); Dane Sutherland, Madison, AL (US)

(73) Assignee: Universal Lighting Technologies Inc., Madison, AL (US)

( * ) Notice: Subject to any disclaimer, the term of this patent is extended or adjusted under 35 U.S.C. 154(b) by 26 days.

(21) Appl. No.: 17/649,775

(22) Filed: Feb. 2, 2022

Related U.S. Application Data

(60) Provisional application No. 63/296,410, filed on Jan. 4, 2022, provisional application No. 63/281,205, filed on Nov. 19, 2021.

(51) Int. Cl.
| | | |
|---|---|---|
| *H05B 45/385* | (2020.01) | |
| *H02M 3/335* | (2006.01) | |
| *H02M 1/08* | (2006.01) | |
| *H02M 1/00* | (2006.01) | |

(Continued)

(52) U.S. Cl.
CPC ........ *H05B 45/385* (2020.01); *H02M 1/0067* (2021.05); *H02M 1/08* (2013.01); *H02M 1/32* (2013.01); *H02M 3/33523* (2013.01); *H05B 45/10* (2020.01); *H02M 1/0054* (2021.05)

(58) Field of Classification Search
CPC ........... H02M 3/33507; H02M 1/0054; H02M 3/33592; H02M 3/33523; H02M 3/33515; H02M 1/0009; H02M 1/0025; H02M 3/157; H02M 1/007; H02M 1/0043; H02M 7/493; Y02B 70/10; Y02B 20/30; Y02B 40/00; H05B 45/385; H05B 45/3725; H05B 45/38; H05B 45/59; H05B 45/355; H05B 45/3574; H05B 45/3578; H05B 45/375; H05B 45/382; H05B 45/395; H05B 45/44; H05B 45/46; H05B 45/48; H05B 45/50; H05B 45/305

See application file for complete search history.

(56) References Cited

U.S. PATENT DOCUMENTS

| | | | | |
|---|---|---|---|---|
| 5,272,613 | A * | 12/1993 | Buthker | H02M 3/33569 363/21.01 |
| 7,535,734 | B2 * | 5/2009 | Li | H02M 1/4258 363/21.04 |

(Continued)

*Primary Examiner* — Monica C King
(74) *Attorney, Agent, or Firm* — Patterson Intellectual Property Law PC

(57) ABSTRACT

A two-stage driver supplies current to an LED load. A first stage of the driver generates a bulk voltage. A second stage has a flyback transformer with a primary winding and a secondary winding. The second stage generates an output voltage to cause LED load current. The primary winding is turned on and off by a gating signal. Control logic within the second stage is responsive to initially turning on the driver to perform a startup short circuit test of the output circuit by applying a gating signal with a short on-time and a low switching frequency. If the output circuit is not shorted, the control logic increases the on-time and the switching frequency to detect if an output current is excessive. If the output current is not excessive, the control logic adjusts the on-time and the frequency to provide sufficient current to illuminate the LED load.

14 Claims, 19 Drawing Sheets

(51) Int. Cl.
*H05B 45/10* (2020.01)
*H02M 1/32* (2007.01)

(56) References Cited

U.S. PATENT DOCUMENTS 10,355,606 B2 7/2019 Cannenterre et al.
11,546,979 B1 * 1/2023 Price ..................... H05B 45/59

* cited by examiner

US 11,737,189 B1

STARTUP CURRENT CONTROL METHOD FOR FLYBACK CONVERTER

RELATED APPLICATION

This application claims the benefit under 35 USC. § 119(e) of U.S. Provisional Application No. 63/296,410, filed Jan. 4, 2022, entitled "Current Control Method for Flyback Converter," and U.S. Provisional Application No. 63/281,205, filed Nov. 19, 2021, entitled "Dynamic Valley Sensing Method for Double Flyback LED Driver," which are hereby incorporated by reference in their entireties.

FIELD OF THE INVENTION

The present disclosure relates generally to lighting systems and, more particularly, to apparatuses to control light-emitting diodes (LEDs).

BACKGROUND

A conventional single-stage flyback converter provides a low-cost solution for a class II LED driver. The flyback converter has a low component count, provides a high power factor (PF), has a low total harmonic distortion (THD), and has an isolated output. Control logic within the converter senses the output current through a plurality of LEDs and regulates the output current by controlling a semiconductor switch in a switching circuit. The control logic controls the switching of the semiconductor switch to cause the output current to have a magnitude corresponding to a dimmer control input. Such a conventional single-stage flyback converter has drawbacks. For example, the converter is operable only over a narrow voltage range and a narrow current range. The converter has a high 120 Hz current ripple. The converter may be unstable in a low dimming range, which may cause flickering. The leakage inductance of a flyback transformer in the converter has to be tightly controlled to avoid high voltage overshoot across the switching semiconductor. The control logic has to provide isolation to transfer a feedback control signal from a secondary side to a primary side, which have isolated ground references. These drawbacks limit the application of the single-stage flyback topology in LED driver applications.

Another drawback of flyback topologies is that during initial startup from a power-off condition or from a standby condition, the voltage applied to the LEDs may overshoot and cause current to flow through the LEDs before the driver is fully controlling the voltage and the current. Another potential issue is a short circuit that may occur in an output circuit that includes the LEDs. If the short circuit is not detected at the beginning of the startup process, excessive current may flow in the driver and cause damage.

SUMMARY

A need exists for a driver for an LED-based lighting system based on flyback topology that eliminates or reduces the drawbacks of a conventional single-stage flyback converter and that reduces or eliminates any voltage or current overshoot during initial startup.

One aspect of the embodiments disclosed herein is a two-stage driver that supplies current to an LED load. A first stage of the driver generates a bulk voltage. A second stage has a flyback transformer with a primary winding and a secondary winding. The second stage generates an output voltage to cause LED load current. The primary winding is turned on and off by a gating signal. Control logic within the second stage is responsive to initially turning on the driver to perform a startup short circuit test of the output circuit by applying a gating signal with a short on-time and a low switching frequency. If the output circuit is not shorted, the control logic increases the on-time and the switching frequency to detect if an output current is excessive. If the output current is not excessive, the control logic adjusts the on-time and the frequency to provide sufficient current to illuminate the LED load.

Another aspect of the embodiments disclosed herein is a two-stage driver for supplying current to a light-emitting diode (LED) load. The two-stage driver comprises a first stage having a first flyback converter. The first flyback converter includes a first flyback transformer having a primary winding referenced to a primary ground reference. A secondary winding is referenced to a secondary ground reference. The first stage is configured to receive a non-regulated voltage input and to generate a substantially constant bulk voltage across a first-stage output filter capacitor. The substantially constant bulk voltage is referenced to the secondary ground reference. An electrically isolated second stage has a second flyback converter. The second stage is configured to receive the bulk voltage from the first stage. The second stage is further configured to generate a desired current through an output circuit including the LED load. The second flyback converter has a second flyback transformer having a respective primary winding and a respective secondary winding. The respective primary winding is driven by a semiconductor switch. The semiconductor switch is driven by a gating signal having a variable on-time and having a variable switching frequency and a corresponding variable switching cycle. The respective primary winding of the second flyback transformer is charged during the on-time. The respective secondary winding discharges after the on-time of the gating signal driving the semiconductor switch. Discharging of the respective secondary winding generates a respective secondary voltage to the output circuit. Control logic is configured to sense a change from an off condition to an on condition and to initiate a startup cycle. The control logic is configured to adjust the gating signal to have a first startup on-time and a first startup frequency. The control logic is further configured to measure an output voltage across the output circuit to detect an increase in the output voltage, thereby confirming that the output circuit is not shorted. The control logic further is configured to adjust the gating signal to have a second on-time and a second frequency to generate an increasing output voltage across the output circuit. The control logic is further configured to detect a current through the LED and a voltage across the output circuit. The control logic is responsive to the detected current and the LED voltage to further adjust the on-time and the frequency of the gating signal to enable sufficient current to flow through the LED load to cause the LED load to illuminate.

In certain embodiments in accordance with this aspect, the control logic is further configured to enable a runtime short circuit test after adjusting the gating signal to have the second on-time and the second frequency to confirm that the current through the LED load does not exceed a threshold current level. The control logic is configured to enable the runtime short circuit test as a background process while the LED load is illuminated.

In certain embodiments in accordance with this aspect, the respective secondary winding generates a ringing voltage after the respective secondary winding current is discharged. The ringing voltage has a ringing period comprising alternating minima (valleys) and maxima (peaks). The second flyback converter includes a valley sense circuit, which is configured to generate an active valley sense output signal in response to detection of each minimum during the ringing of the respective secondary voltage. The control logic is further configured to sense the active valley sense output signal and to control the gating signal to turn on the semiconductor switch when the valley sense output signal is active. The control logic is further configured to sense a valley jump indicator when the gating signal is turned on in different valleys in subsequent cycles. The control logic is responsive to the valley jump indicator to adjust a maximum switching frequency limit of the gating signal.

In certain embodiments in accordance with this aspect, the second flyback converter includes a counter within the control logic that determines a first elapsed time between a beginning of a first switching cycle and a beginning of second switching cycle. The counter also determines a second elapsed time between the beginning of the second switching cycle and a beginning of a third switching cycle. The second flyback converter further includes a comparator within the control logic that compares a difference between the first elapsed time and the second elapsed time with a threshold value. The comparator generates the valley jump indicator when the difference exceeds the threshold value. In certain embodiments in accordance with this aspect, the second flyback converter includes a frequency limit adjustment routine within the control logic. The frequency limit adjustment routine is responsive to the valley jump indicator to generate an adjusted maximum frequency limit of the variable frequency of the gating signal. The control logic is responsive to the adjusted maximum frequency limit to generate the gating signal with a frequency no greater than the adjusted maximum frequency limit.

In certain embodiments, the first elapsed time corresponds to a first switching frequency f[0] and the second elapsed time corresponds to a second switching frequency f[1]. The frequency adjustment routine is configured to provide a base frequency limit in a first state. The frequency adjustment routine is configured to provide a modified frequency limit in a second state, wherein the modified frequency limit is an average of the first switching frequency f[0] and the second switching frequency f[1]. When in the first state, the frequency adjustment routine is configured to advance to the second state on an occurrence of the valley jump indicator and to change the maximum frequency limit from the base frequency limit to the modified frequency limit. When in the second state, the frequency adjustment routine is configured advance to the first state on an occurrence of the valley jump indicator and to change the maximum frequency limit from the modified frequency limit to the base frequency limit.

In certain embodiments, the frequency adjustment routine is configured to provide a base maximum frequency limit in a first state. The frequency adjustment routine is configured to provide a first different frequency limit in a second state. The frequency adjustment routine is configured to provide a second different frequency limit in a third state. When in the first state, the frequency adjustment routine is configured to advance to the second state on an occurrence of the valley jump indicator and to change the maximum switching frequency limit from the base maximum frequency limit to the first different frequency limit. When in the second state, the frequency adjustment routine is configured to advance to the third state on an occurrence of the valley jump indicator and to change the maximum switching frequency limit from the first different frequency limit to the second different frequency limit. When in the third state, the frequency adjustment routine is configured to advance to the first state on an occurrence of the valley jump indicator and to change the maximum switching frequency limit from the second different frequency limit to the base maximum frequency limit.

Another aspect of the embodiments disclosed herein is a method of controlling the current through light-emitting diodes (LEDs). The method comprises generating a bulk DC voltage from an input source using a first flyback converter stage having a first flyback transformer, the first flyback transformer having a first primary winding referenced to a primary ground reference, the first flyback transformer having a secondary winding referenced to a secondary ground reference, the secondary ground reference isolated from the primary ground reference. The method further comprises converting the bulk DC voltage to a controlled current through the LEDs using a second flyback converter having a second flyback transformer. The second flyback transformer has a respective primary winding and a respective secondary winding. The respective primary winding is driven by a semiconductor switch referenced to the secondary ground reference. The method further comprises controlling the semiconductor switch with a gating signal to cause the semiconductor switch to have an on-time with a controllable duration. The on-time repeats with a controllable switching period having a corresponding switching frequency. The primary winding of the second flyback transformer charges with current during the on-time of the semiconductor switch. The second flyback transformer discharges current through the respective secondary winding after the duration of the on-time to generate a secondary voltage across an output circuit. The method further comprises sensing a change from an off condition to an on condition and initiating a startup cycle. The method adjusts the gating signal to have a first startup on-time and a first startup frequency. The method measures an output voltage across the output circuit to detect an increase in the output voltage, thereby confirming that the output circuit is not shorted. If the output voltage increases, the method adjusts the gating signal to have a second on time and a second frequency to further increase the output voltage across the output circuit; the method detects a current through the LED load and determines a magnitude of the output voltage; and the method further adjusts the on-time and the frequency of the gating signal in response to the detected current and the magnitude of the output voltage to enable sufficient current to flow through the LED load to cause the LED load to illuminate.

In certain embodiments in accordance with this aspect, the method comprises enabling a runtime short circuit test after adjusting the gating signal to have the second on-time and the second frequency to confirm that the current through the LED load does not exceed a threshold current level. The method continues the runtime short circuit test as a background process while the LED load is illuminated.

In certain embodiments in accordance with this aspect, the secondary voltage rings with a plurality of alternating minima (valleys) and maxima (peaks) when the secondary current is discharged. The method further includes detecting the valleys in the ringing of the secondary voltage; switching the semiconductor switch on during a detected valley; detecting when the semiconductor switch is turned on during a different valley in subsequent switching period; and adjusting the controllable switching period.

In certain embodiments in accordance with this aspect, the method comprises determining a first elapsed time between a beginning of a first switching period and a beginning of second switching period. The method determines a second elapsed time between the beginning of the second switching period and a beginning of a third switching period. The method compares a difference between the first elapsed time and the second elapsed time with a threshold value. The method generates the valley jump indicator when the difference exceeds the threshold value. In certain embodiments the method generates an adjusted maximum frequency limit of the gating signal. The method generates the gating signal with a frequency no greater than the adjusted maximum frequency limit.

In certain embodiments, the method provides a first switching frequency f[0] corresponding to the first elapsed time. The method provides a second switching frequency f[1] corresponding to the second elapsed time. The method provides a base frequency limit in a first state. The method provides a modified frequency limit in a second state, wherein the modified frequency limit is an average of the first switching frequency f[0] and the second switching frequency f[1]. On an occurrence of the valley jump signal when in the first state, the method advances to the second state and changes the maximum frequency limit from the base frequency limit to the modified frequency limit. On an occurrence of the valley jump signal in the second state, the method advances to the first state and changes the maximum frequency limit from the modified frequency limit to the base frequency limit.

In certain embodiments, the method provides a base maximum frequency limit in a first state. The method provides a first different frequency limit in a second state. The method provides a second different frequency limit in a third state. On an occurrence of the valley jump indicator when in the first state, the method advances to the second state and changes the maximum switching frequency limit from the base maximum frequency limit to the first different frequency limit. On an occurrence of the valley jump indicator when in the second state, the method advances to the third state and changes the maximum switching frequency limit from the first different frequency limit to the second different frequency limit. On an occurrence of the valley jump indicator when in the third state, the method advances to the first state and changes the maximum switching frequency limit from the second different frequency limit to the base maximum frequency limit.

BRIEF DESCRIPTIONS OF THE SEVERAL VIEWS OF THE DRAWINGS

Figure 19:
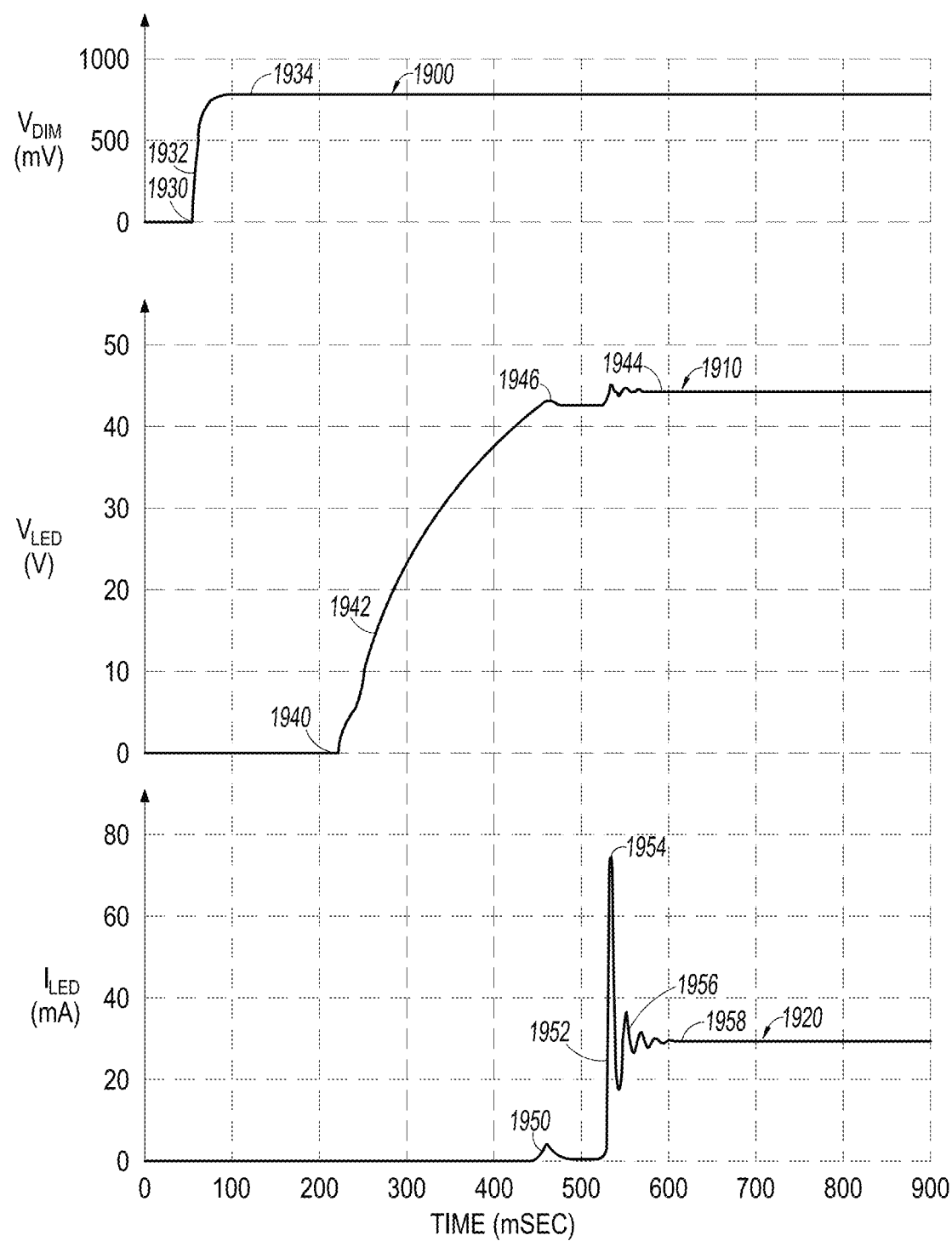

FIG. 19 illustrates waveforms showing the problem solved by the improved fast startup sequence described herein wherein the improved fast startup sequence is disabled, and wherein an upper waveform represents a dimming control signal switching from a standby condition to a full current condition, a middle waveform represents the LED voltage $V_{LED}$, and a lower waveform represents the current $I_{LED}$ through the LED load, the LED current exhibiting turn-on overshoots.

Figure 20:
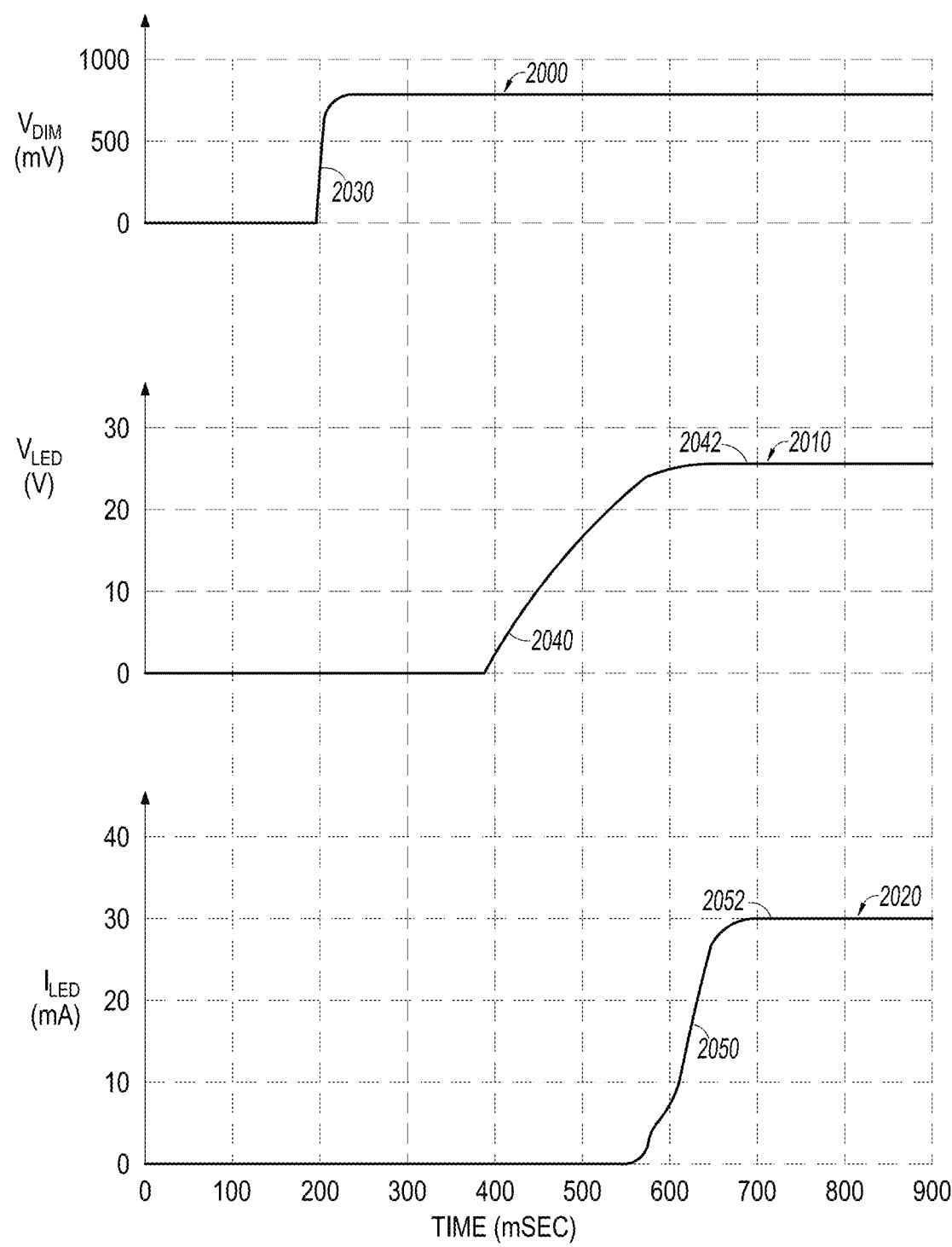

FIG. 20 illustrates the waveforms of FIG. 19 with the improved fast startup sequence enabled such that the LED current has no turn-on overshoots.

Figure 21:
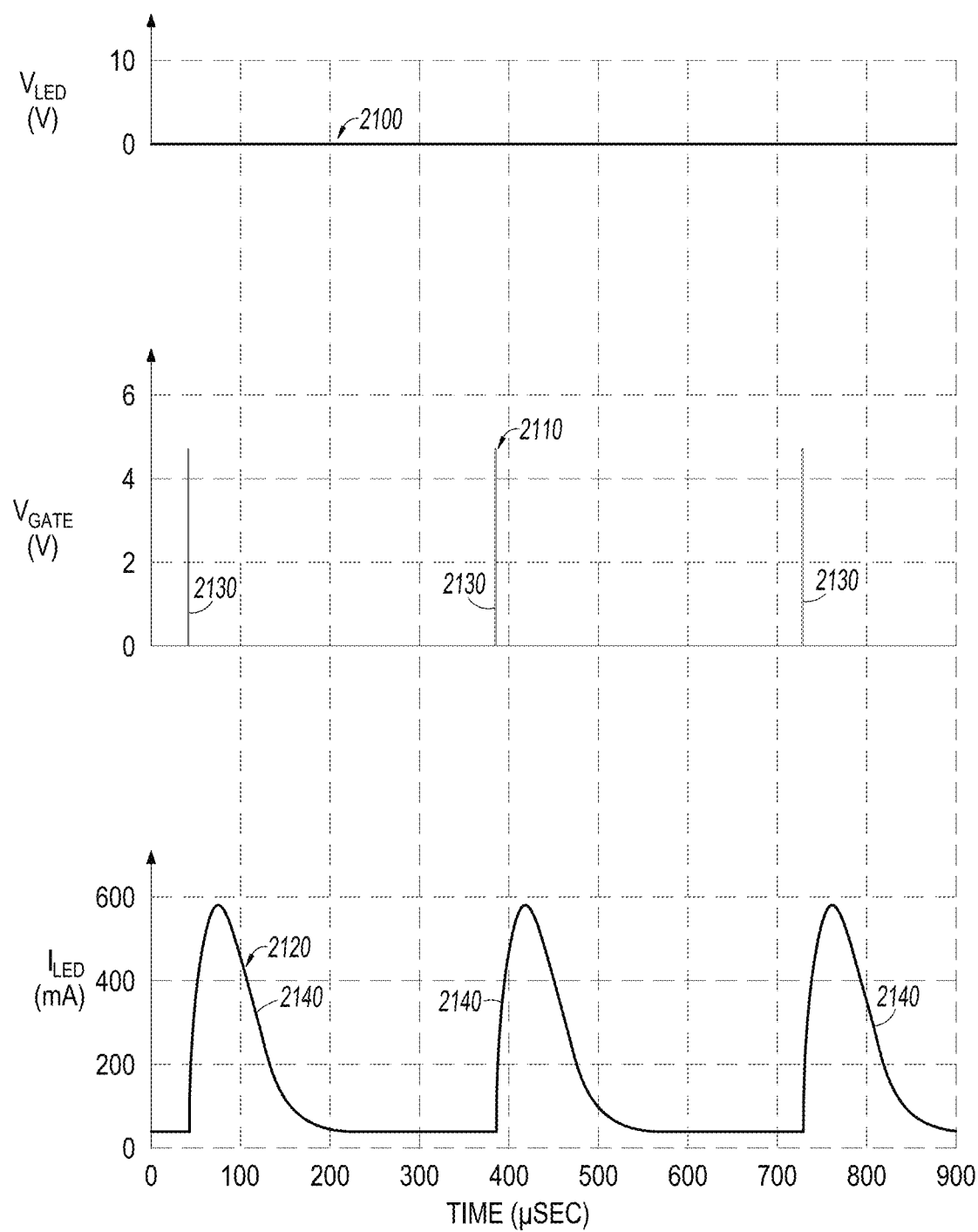

FIG. 21 illustrates waveforms that occur when an output short circuit occurs during the startup process, an upper waveform representing the LED voltage $V_{LED}$ shorted to 0 volts, a middle waveform representing periodic gating pulses, and a lower waveform representing current pulses that dissipate rapidly and that are below a potentially harmful level.

Figure 22:
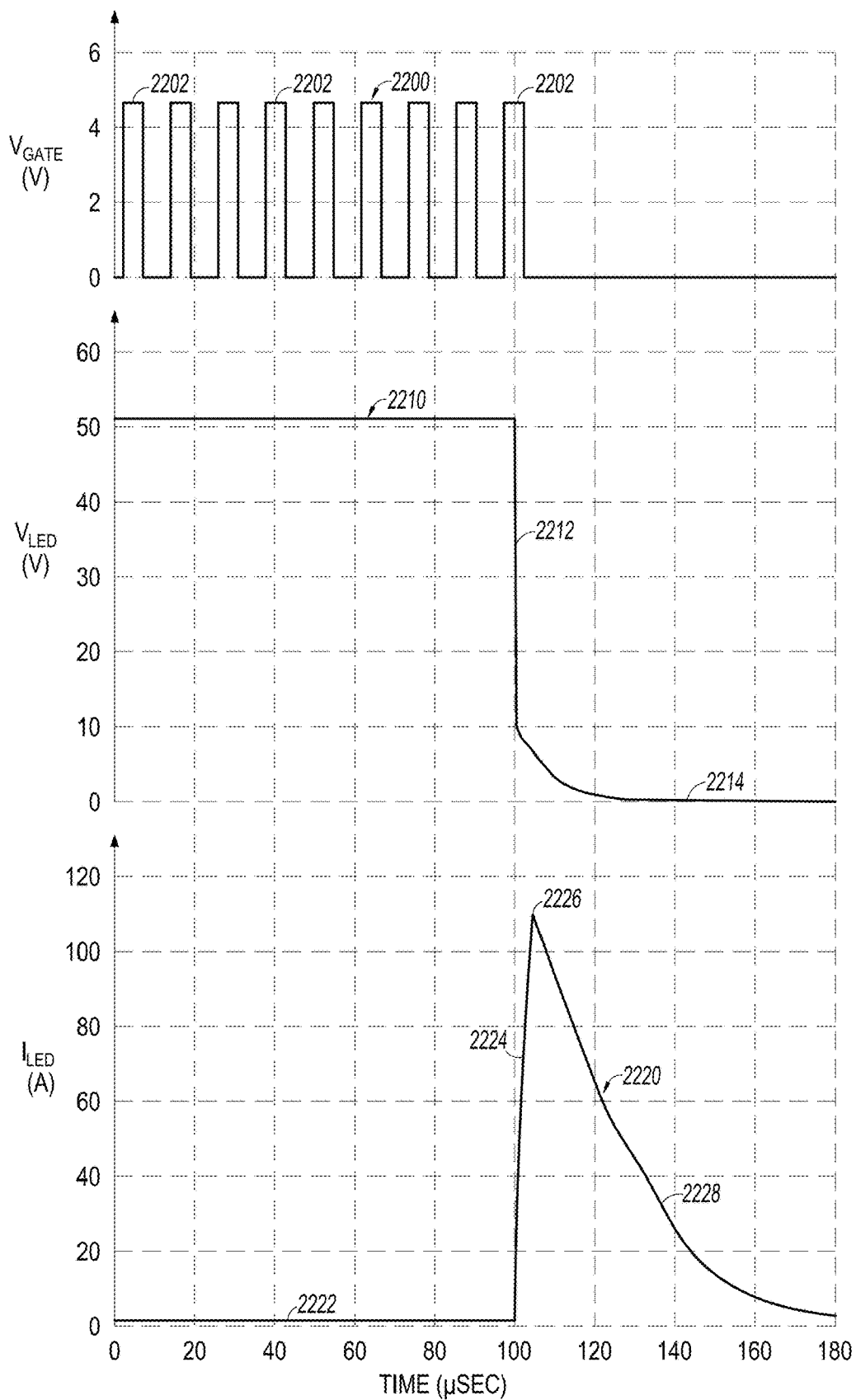

FIG. 22 illustrates an upper waveform that represents periodic gating pulse, a middle waveform that represents the voltage across the LED load, and a lower waveform that represents the current through the LED load, wherein the voltage is rapidly decreased to 0 volts by a short circuit, the load current increases rapidly in response to the short circuit, and the gating pulses are terminated within one gating period to discontinue providing current to the shorted load.

DETAILED DESCRIPTION

The following detailed description of embodiments of the present disclosure refers to one or more drawings. Each drawing is provided by way of explanation of the present disclosure and is not a limitation. Those skilled in the art will understand that various modifications and variations can be made to the teachings of the present disclosure without departing from the scope of the disclosure. For instance, features illustrated or described as part of one embodiment can be used with another embodiment to yield a still further embodiment.

The present disclosure is intended to cover such modifications and variations as come within the scope of the appended claims and their equivalents. Other objects, features, and aspects of the present disclosure are disclosed in the following detailed description. One of ordinary skill in the art will understand that the present discussion is a description of exemplary embodiments only and is not intended as limiting the broader aspects of the present disclosure.

Figure 1:
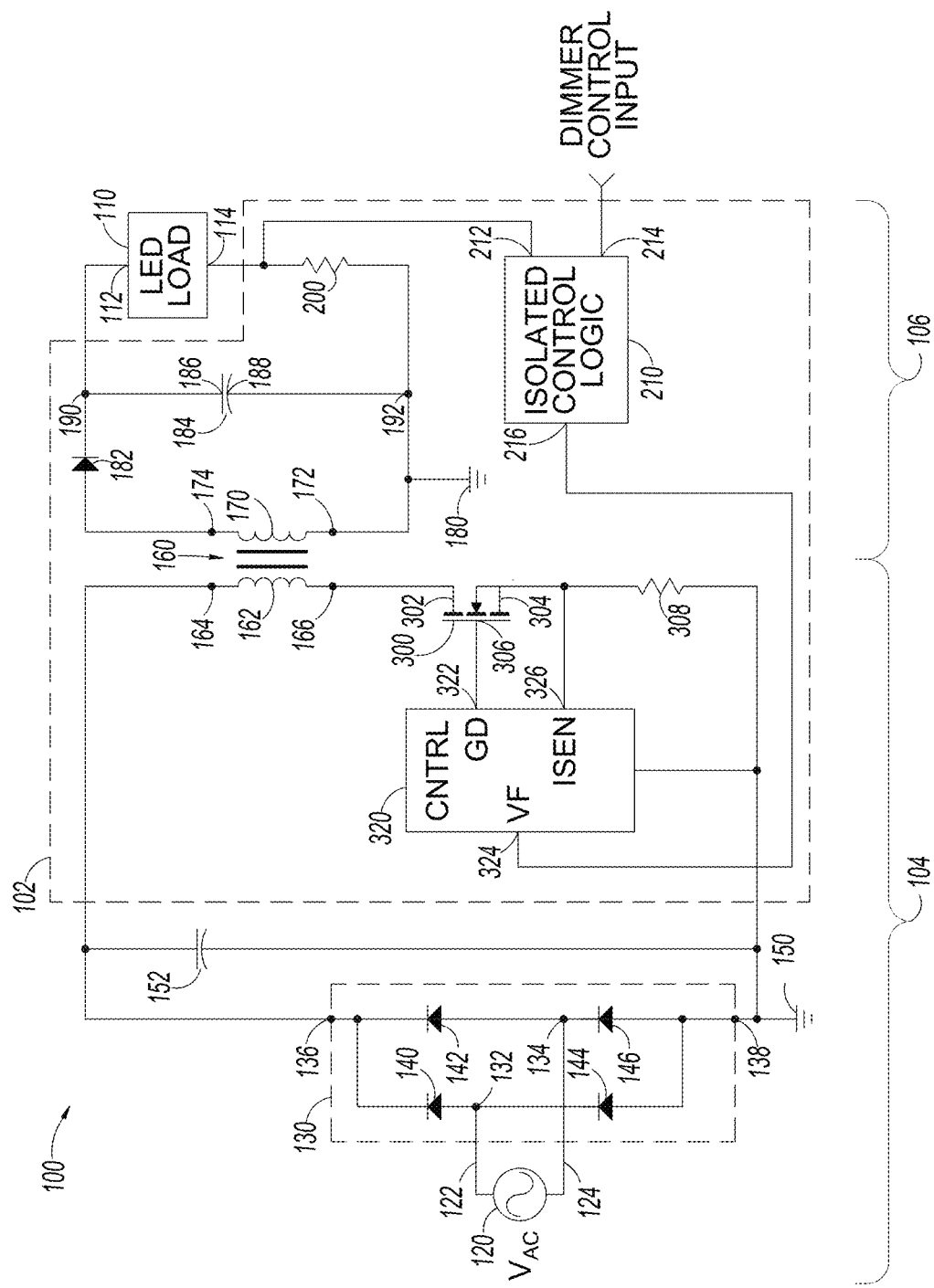
FIG. 1 illustrates a circuit diagram of an exemplary single-stage flyback converter configured as an LED driver to drive an LED load.

FIG. 1 illustrates a conventional LED driver 100 based on a flyback converter 102. The LED driver includes a primary section 104 and a secondary section 106. The LED driver provides current to an LED load 110. In the illustrated embodiment, the LED load comprises a plurality of LEDs (not shown) connected between a first terminal 112 of the LED load and a second terminal 114 of the LED load. The load current flowing through the LEDs causes the LEDs to illuminate. In order to provide consistent illumination, the load current through the LEDs is maintained at a substantially constant magnitude. The illustrated LED driver utilizes a secondary current sensing technique (described below) to control the secondary current.

An AC source 120 provides an AC input voltage to the LED driver 100 via a first AC input line 122 and a second AC input line 124. In the illustrated embodiment, the AC input voltage may vary from 86 volts RMS to 265 volts RMS. The AC input voltage between the first AC input line and the second AC input line is applied between a first input terminal 132 and a second input terminal 134 of a full-wave bridge rectifier 130. The bridge rectifier has a first output terminal 136 and a second output terminal 138. A first rectifier diode 140 has an anode connected to the first input terminal and a cathode connected to the first output terminal. A second rectifier diode 142 has an anode connected to the second input terminal and a cathode connected to the first output terminal. A third rectifier diode 144 has an anode connected to the second output terminal and has a cathode connected to the first input terminal. A fourth rectifier diode 146 has an anode connected to the second output terminal and has a cathode connected to the second input terminal. The bridge rectifier operates in a conventional manner to produce a pulsating DC voltage on the first output terminal which is referenced to the second output terminal. The second output terminal is connected to a primary ground reference 150. An input filter capacitor 152 is connected between the first output terminal and the primary ground reference. The input filter capacitor smooths the pulsating DC voltage.

The first output terminal 136 of the bridge rectifier 130 is connected to a first terminal 164 of the primary winding 162 of a flyback transformer 160 in the flyback converter 102. The flyback transformer galvanically isolates the primary section 104 of the LED driver 100 from the secondary section 106. The primary winding of the flyback transformer has a second terminal 166. The flyback transformer has a secondary winding 170, which has a first terminal 172 and a second terminal 174. The flyback transformer has an N:1 turns ratio between the primary winding and the secondary winding such that the voltage across the primary winding is N times the voltage across the secondary winding and such that the current through the secondary winding is N times the current through the primary winding. The flyback transformer may also have at least one auxiliary winding (not shown in FIG. 1).

The first terminal 172 of the secondary winding 170 of the flyback transformer 160 is connected to a secondary ground reference 180. The secondary ground reference is electrically isolated from the primary ground reference 150 by the flyback transformer. The second terminal 174 of the secondary winding is connected to the anode of a secondary diode 182. The cathode of the secondary diode is connected to the first terminal 186 of a secondary filter capacitor 184. The secondary filter capacitor may also be referred to as an output filter capacitor. A second terminal 188 of the secondary filter capacitor is connected to the secondary ground reference and thus to the first terminal of the secondary winding of the flyback transformer. In one embodiment, the secondary filter capacitor has a capacitance of approximately 2,000 microfarads. The cathode of the secondary diode and the first terminal of the secondary filter capacitor are connected to a first output terminal 190 of the LED driver 100, which is connected to the first terminal 112 of the LED load 110. The secondary ground reference is connected to a second output terminal 192 of the LED driver via a secondary current sensing resistor 200. The second output terminal of the LED driver is connected to the second terminal 114 of the LED load.

The second terminal 114 of the LED load 110 is connected to a first input 212 of an isolated control logic circuit 210. A second input 214 of the isolated control logic circuit receives a dimmer control input from a dimmer control source (not shown). The dimmer control input has a voltage corresponding to a desired current flow through the LED load. The current lowing through the secondary current sensing resistor 200 generates a voltage across the secondary current sensing resistor proportional to the magnitude of the current flowing through the LED load. The isolated control logic circuit compares the voltage across the secondary current sensing resistor with the voltage of the dimmer control input and generates a feedback signal on an output terminal 216 responsive to the difference in the two voltages. The feedback signal on the output terminal of the isolated control logic circuit is isolated from the secondary ground reference 180 and is referenced to the primary ground reference 150. For example, the isolated control logic circuit may include an optical isolator in an output circuit.

As further shown in FIG. 1, the second terminal 166 of the primary winding 162 of the flyback transformer 160 is connected to a first terminal 302 of a first semiconductor switch 300. The first semiconductor switch further includes a second terminal 304 and a control (gate) terminal 306. For example, the first semiconductor switch may comprise a metal oxide semiconductor field effect transistor (MOSFET) wherein the first terminal is the drain of the first MOSFET, the second terminal is the source of the first MOSFET, and the control terminal is the gate of the first MOSFET. In the illustrated embodiment, the first MOSFET is an N channel enhancement mode transistor, which is normally off (e.g., has a high impedance between the drain and the source). The first MOSFET is turned on to provide a low-impedance path (e.g., a few tens of milliohms) between the drain and the source when a sufficiently large voltage differential is applied between the gate and the source of the first MOSFET. The second terminal (source) of the first MOSFET is connected to the primary ground reference 150 via a primary current sensing resistor 308. When the first MOSFET turned on, a current flows from the first output terminal 136 of the bridge rectifier 130, through the primary winding 162 of the flyback transformer 160, through the first MOSFET from the first terminal (drain) to the second terminal (source), and to the primary ground reference via the primary current sensing resistor. A voltage is developed across the primary current sensing resistor. The voltage is proportional to the current through the current flowing through the primary winding.

The control (gate) terminal 306 of the first MOSFET 300 is controlled by a gate drive (GD) output terminal 322 of a switch controller integrated circuit (CNTRL IC) 320. In the illustrated embodiment, the switch controller IC comprises an L6562 transition-mode power factor correction (PFC) controller, which is commercially available from STMicroelectronics of Geneva, Switzerland. The switch controller IC receives a feedback voltage via a voltage feedback (VF) input terminal 324, which is connected to receive the feedback voltage from the output terminal of the isolated control logic circuit 210 in the secondary section 106. Thus, the switch controller IC receives a voltage responsive to the difference between the instantaneous LED load current flowing through the secondary current sensing resistor 200 and the desired LED load current. The switch controller IC further includes a current sense (ISEN) input terminal 326, which receives the voltage generated across the primary current sensing resistor 308. The voltage is proportional to the current through the primary winding 162 of the flyback transformer 160. The switch controller IC monitors this current sensing voltage internally to determine when to switch off the gate drive signal on the gate drive (GD) output terminal 322. The illustrated switch controller IC includes additional inputs (e.g., power input and compensation inputs), which are not shown in FIG. 1.

The switch controller IC 320 operates in a conventional manner to output a high output signal on the gate drive (GD) output terminal 322 to turn on the first MOSFET 300 to cause current to flow through the primary winding 162 of the flyback transformer 160 from the first terminal 164 to the second terminal 166 of the primary winding. The switch controller IC outputs a low output signal on the gate control output terminal to turn off the first MOSFET to stop current flow through the primary winding of the transformer. The time varying current flowing through the primary winding generates current flow in the secondary winding 170, which is rectified by the secondary diode 182 and which is applied to the secondary filter capacitor 184 to thereby charge the secondary filter capacitor. The voltage across the secondary filter capacitor is applied to the LED load 110 to cause an output current to flow through the load.

The output current flowing through the LED load 110 is sensed by the secondary current sensing resistor 200. The voltage representing the sensed current is compared to the voltage of the dimmer control input signal to produce the feedback signal, which is applied to the voltage feedback input (VF) of the switch controller IC 320, as described above. The switch controller IC is responsive to the feedback signal to switch the first MOSFET 300 on and off with varying durations to adjust the voltage across the secondary filter capacitor to a magnitude sufficient to cause the current flowing through the LED load to have a desired magnitude (e.g., 180 milliamps in one example). Note that although the operation of the switch controller IC determines the voltage across the secondary filter capacitor, the actual voltage across the LED load required to maintain the desired current through the LED load varies with the characteristics of the LEDs within the LED load and also varies with other factors such as, for example, temperature. Thus, it should be understood that the sensed output current through the LED load is the controlled parameter. The secondary voltage across the LED load may vary to maintain the sensed current magnitude at or near the desired output current magnitude (e.g., at approximately 180 milliamperes in certain embodiments).

As discussed above, the conventional LED driver 100 illustrated in FIG. 1 has a number of drawbacks. For example, the converter is operable only over a narrow voltage range and a narrow current range. The converter has a high 120 Hz current ripple. The converter may be unstable in a low dimming range which may cause flickering. The leakage inductance of a flyback transformer in the converter has to be tightly controlled to avoid high voltage overshoot across the switching semiconductor. The control logic has to provide isolation to transfer a feedback control signal from a secondary side to a primary side which have isolated ground references. These drawbacks limit the application of the single-stage flyback topology in LED driver applications.

Figure 2:
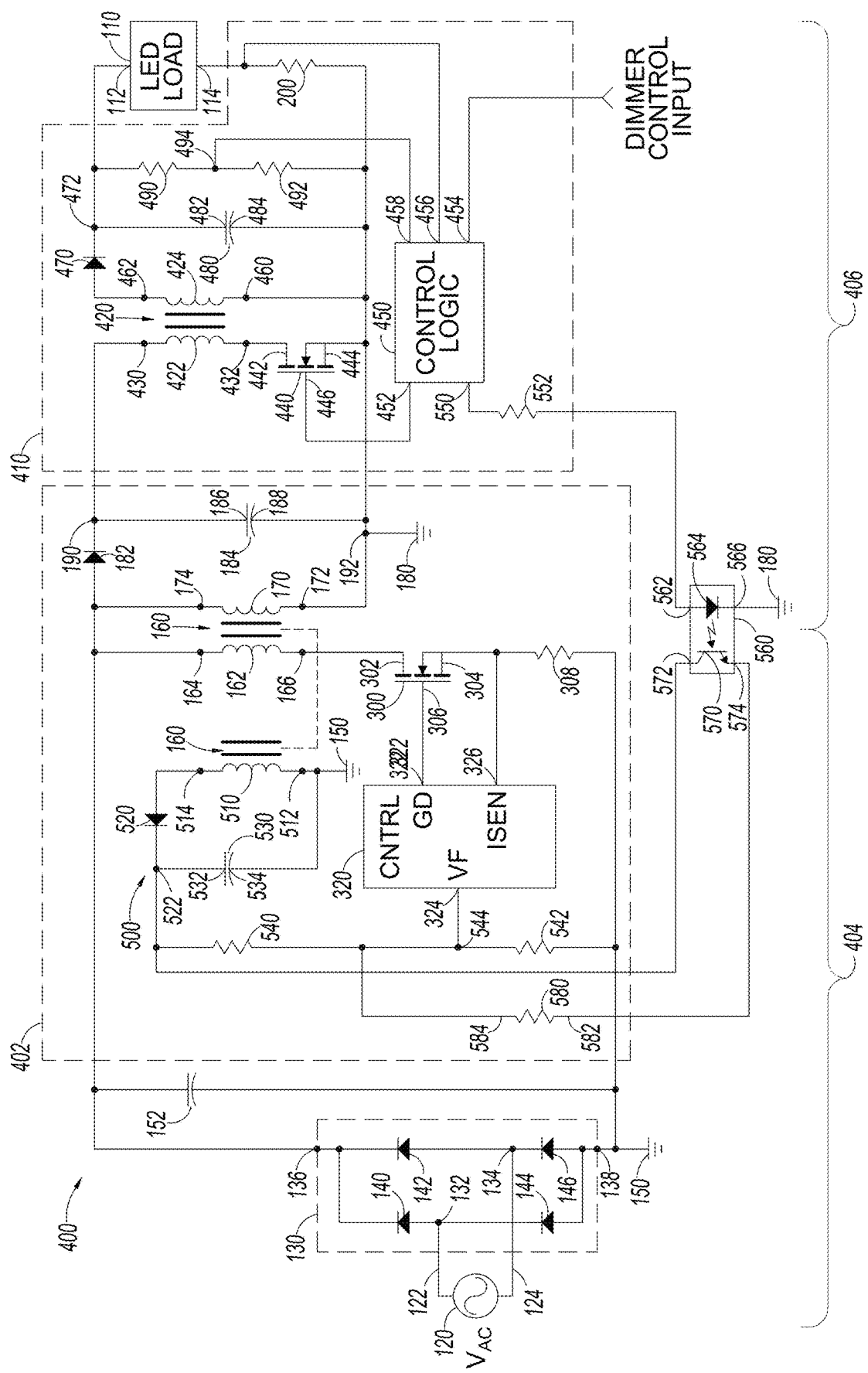
FIG. 2 illustrates a circuit diagram of an improved LED driver having a non-isolated flyback converter interposed between the single-stage flyback converter and the LED load.

FIG. 2 illustrates an LED driver 400 that avoids the drawbacks of the LED driver 100 of FIG. 1. The LED driver of FIG. 2 includes a modified primary flyback converter 402 in a modified primary section 404. The LED driver of FIG. 2 further includes a modified secondary section 406. The LED driver of FIG. 2 includes elements corresponding to the elements of the LED driver 100, and like elements are identified with the corresponding reference numbers.

In the LED driver 400 of FIG. 2, the modified secondary section 406 includes a non-isolated secondary stage flyback converter 410 connected between the first output terminal 190 of the modified primary flyback converter 402 and the LED load 110. The secondary stage flyback converter includes a second flyback transformer 420 having a primary winding 422 and a secondary winding 424. A first terminal 430 of the primary winding of the second flyback transformer is connected to the first output terminal 190 of the modified primary flyback converter to receive a bulk voltage $V_{BULK}$ generated across the secondary filter capacitor 184. A second terminal 432 of the primary winding of the second flyback transformer is connected to a first (drain) terminal 442 of a second MOSFET 440. A second (source) terminal 444 of the second MOSFET is connected to the second output terminal 192 of the modified primary flyback converter and is thus connected to the secondary ground reference 180. A gate terminal 446 of the second MOSFET is connected to an output terminal 452 of a control logic circuit 450. The control logic circuit has a first input terminal 454, which is connected to receive the dimmer control input signal. The control logic circuit has a second input terminal 456 connected to the second terminal 114 of the LED load 110 and thus connected to receive the voltage developed across the secondary current sensing resistor 200, which is proportional to the current through the LED load. The control logic circuit has a third input terminal 458. The connection to the third input terminal of the control logic circuit is described below. In the illustrated embodiment, the control logic circuit is implemented as a microcontroller such as the XMC1300 microcontroller, which is commercially available from Infineon Technologies AG of Munich, Germany.

The secondary winding 424 of the second flyback transformer 420 has a first terminal 460 and a second terminal 462. The first terminal is connected to the secondary ground reference 180. The second terminal is connected to an anode of a secondary flyback converter diode 470. A cathode of the secondary flyback converter diode is connected to an output terminal 472 of the secondary stage flyback converter 410. A secondary flyback converter filter capacitor 480 has a first terminal 482 connected to the output terminal of the secondary stage flyback converter and has a second terminal 484 connected to the secondary ground reference.

A first secondary voltage sensing resistor 490 and a second secondary voltage sensing resistor 492 are connected in series between the output terminal 472 of the secondary stage flyback converter 410 and the secondary ground reference 180. The two voltage sensing resistors are connected at a secondary voltage sensing node 494. The two voltage sensing resistors are connected as a voltage divider circuit such that the voltage on the secondary voltage sensing node is proportional to the voltage between the output terminal of the secondary stage flyback converter and the secondary ground reference. The secondary voltage sensing node is connected to the third terminal 458 of the control logic circuit 450.

The control logic circuit 450 receives the voltage across the secondary current sensing resistor 200 on the second input terminal 456 and receives the voltage representing the desired current on the first input terminal 454. The control logic circuit compares the two voltages and regulates the switching of the second MOSFET 440 to adjust the output current to correspond to the desired current. The control logic circuit also receives the voltage proportional to the output voltage on the third input terminal 458 and adjusts the switching of the second MOSFET to maintain the output voltage within a desired voltage range.

The LED driver 400 of FIG. 2 has a number of advantages. The primary winding 422 and the secondary winding 424 of the second flyback transformer 420 have respective terminals connected to the secondary ground reference 180. The source terminal 444 of the second MOSFET 440 is connected to the secondary ground reference, and the control logic circuit 450 is also connected to the secondary ground reference. Thus, the secondary flyback transformer is not electrically isolated, which allows the gate drive circuitry to be a simple logic signal referenced to the secondary ground reference.

The LED load 110 is not electrically isolated from the primary winding 422 of the second flyback transformer 420 because the secondary winding 424 and the primary winding are connected to the common secondary ground reference 180. However, electrical isolation of the LED load from the primary winding of the secondary flyback transformer is not necessary because the flyback transformer 160 in the modified primary flyback converter 402 provides electrical isolation between the modified primary section 404 and the modified secondary section 406 and thus isolates the LED load from the modified primary section. The LED load in FIG. 2 is not in the main power path from the secondary filter capacitor 184. Thus, even if the second MOSFET 440 is shorted, no large currents will flow through the LED load and no large voltage will appear across the LED load because the secondary flyback transformer provides power isolation between the secondary filter capacitor and the LED load. Accordingly, no additional control circuitry is needed to handle a short across the second MOSFET. This simplifies the design of the LED driver and reduces the cost.

The current through the LED load 110 is tightly controlled by the secondary stage flyback converter 410. Thus, the bulk voltage $V_{BULK}$ output of the modified primary flyback converter 402 on the first output terminal 190 applied across the secondary filter capacitor 184 does not have to be tightly controlled. Accordingly, the LED driver 400 of FIG. 2 does not have any feedback from the modified secondary section 406 to the modified primary section 404. Instead, the modified primary section includes a simple primary voltage control circuit 500 comprising a first auxiliary winding 510 forming part of the flyback transformer 160. A first terminal 512 of the first auxiliary winding is connected to the primary ground reference 150. A second terminal 514 of the first auxiliary winding is connected to an anode of a power supply diode 520. A cathode of the power supply diode is connected to a voltage output node 522. A first terminal 532 of a power supply filter capacitor 530 to the voltage output node. A second terminal 534 of the power supply filter capacitor is connected to the primary ground reference 150. A first power supply voltage sensing resistor 540 and a second power supply voltage sensing resistor 542 are connected in series between the voltage output node and the primary ground reference. The two power supply voltage sensing resistors are connected at a power supply voltage sensing node 544. The power supply voltage sensing node is connected to the voltage feedback (VF) input terminal 324 of the switch controller IC 320.

The primary voltage control circuit 500 operates as a simple power supply that rectifies a voltage developed across the first auxiliary winding 510 and produces a rectified voltage across the power supply filter capacitor 530. A voltage proportional to the rectified voltage is produced on the power supply sensing node 544 and is thus applied to the voltage feedback (VF) input terminal 324 of the switch controller IC 320. The switch controller IC is responsive to the sensed voltage to vary the drive signals applied to the first MOSFET 300 to maintain the sensed voltage at a substantially constant voltage determined by an internal reference voltage $V_{REF}$ within the switch controller IC. The voltage developed across the first auxiliary winding is proportional to the voltage across the secondary winding. Accordingly, a voltage $V_{CSEC}$ developed across the secondary filter capacitor 184 has the following relationship to the reference voltage within the switch controller IC:

$$V_{CSEC} = N_{SA} \times V_{REF}\left(\frac{R_{540} + R_{542}}{R_{542}}\right) \tag{1}$$

In Equation (1), $R_{540}$ is the resistance of the first power supply voltage sensing resistor 540 and $R_{542}$ is the resistance of the second power supply voltage sensing resistor 542. In Equation (1), $N_{SA}$ is the turns ratio of the number Ns of secondary turns to the number $N_A$ of auxiliary turns of the flyback transformer 160 of FIG. 2.

As illustrated in FIG. 2, no feedback is required from the modified secondary section 406 to the modified primary section 404 to control the magnitude of the bulk voltage $V_{BULK}$ generated by the modified primary flyback converter 402 in the modified primary section. Accordingly, no isolated feedback circuitry is required, which reduces the complexity and cost of the LED driver 400.

Since the modified secondary section 406 uses the secondary stage flyback converter 410 with the second flyback transformer 420, the turns ratio between the primary winding 422 and the secondary winding 424 of the second flyback transformer is selected to minimize the current through the second MOSFET 440 and the primary winding. The lower current allows the second MOSFET to operate with a moderate drain-to-source on-resistance and also allows the use of smaller wire in the second flyback transformer. Both advantages reduce the cost of the LED driver 400.

The ability to select the turns ratio for the second flyback transformer 420 allows the bulk voltage $V_{BULK}$ generated by the flyback transformer 160 and applied across the secondary filter capacitor 184 to be increased. For example, for a 55-watt LED driver 400 having a bulk voltage across the secondary filter capacitor of approximately 60 volts, the secondary filter capacitor should have a capacitance of at least 470 microfarads to control the 120 Hz voltage ripple within a certain range (e.g., +/−10%). Increasing the turns ratio of the second flyback transformer allows the bulk voltage across the secondary filter capacitor to be increased to 200 volts. The energy E stored in the secondary filter capacitor is determined as $E=\frac{1}{2}CV^2$, wherein C is the capacitance of the secondary filter capacitor and V is the bulk voltage $V_{BULK}$ across the secondary filter capacitor. By increasing the bulk voltage to 200 volts, the capacitance of the secondary filter capacitor can be decreased to 47 microfarads. A 47-microfarad electrolytic capacitor at 200 volts has a much small cost and size than a 470-microfarad capacitor at a lower voltage.

Increasing the bulk voltage $V_{BULK}$ on the secondary filter capacitor 184 has a further benefit of allowing the turns ratio between the primary winding 162 and the secondary winding 170 of the flyback transformer 160 to be 1:1. The 1:1 turns ratio permits the use of bifilar wire to wind the primary winding and the secondary winding together in a single operation. The bifilar winding simplifies the manufacturing process and substantially reduces the leakage inductance of the primary winding. The reduced leakage inductance improves the efficiency of the modified primary section 404 and substantially reduces voltage ringing on the first MOSFET 300 when the first MOSFET is turned off. The reduced voltage ringing improves the electromagnetic interference (EMI) of the LED driver 400.

The LED driver 400 of FIG. 2 includes additional circuitry to reduce power consumption when the dimmer control input is reduced to a dim level or to a level where the current through the LED load is turned off. The control logic circuit 450 includes a second output terminal 550. The second output terminal of the modified control logic circuit is connected via a current limiting resistor 552 to a first input terminal 562 of an optical coupler 560 (also referred to as an optocoupler or an optical isolator) and is thus connected to the anode of a light-emitting diode (LED) 564 within the optical coupler. The cathode of the LED is connected to the secondary ground reference 180 via a second input terminal 566 of the optical coupler. A phototransistor 570 within the optical coupler has a collector connected to a first output terminal 572 and has an emitter connected to a second output terminal 574.

The first output terminal 572 of the optical coupler 560 is connected to the voltage output node 522 of the primary voltage control circuit 500. The second output terminal 574 of the optical coupler is connected to a first terminal 582 of a third power supply voltage sensing resistor 580. A second terminal 584 of the third power supply voltage sensing resistor is connected to the power supply sensing node 544. As connected, when the phototransistor 570 within the optical coupler is conducting, the third power supply voltage sensing resistor 580 is electrically connected in parallel with the first power supply voltage sensing resistor 540 between the voltage output node 522 to the power supply sensing node 544. When the phototransistor is not conducting the third power supply voltage sensing resistor is effectively disconnected.

The control logic circuit 450 operates as described above to receive the voltage inputs on the first input terminal 454, the second input terminal 456 and the third input terminal 458 and to control the first output terminal 452 in response to the voltage inputs. The control logic circuit further monitors the voltage of the dimmer control input on the first input terminal to determine when the voltage corresponds to a low dimming level or an off state. When the modified control logic circuit detects a low dimming level or an off state, the modified control logic circuit generates a high logic level on the second output terminal 550 to provide current through the current limiting resistor 552 to turn on the LED 564 within the optical coupler 560. As described below, this high logic level signal is an active standby mode signal. Light emitted by the LED causes the phototransistor 570 to conduct, which causes the third power supply voltage sensing resistor 580 to be connected electrically in parallel with the first power supply voltage sensing resistor 540 between the voltage output node 522 to the power supply sensing node 544. The lower parallel resistance of the two resistors cause the voltage across the second power supply voltage sensing resistor to be a greater proportion of the voltage on the voltage output node. The switch controller IC 320 adjusts the gate driver signals applied to the gate terminal 306 of the first MOSFET 300 to lower the voltage across the transformer windings such that the voltage applied to the secondary filter capacitor 184 is reduced to a standby voltage $V_{STANDBY}$. The reduced voltage reduces the power consumption of the overall LED driver 400. For example, the standby power can be reduced to less than 500 milliwatts. The foregoing can be understood from the following Equation (2), which corresponds to Equation (1) with a resistance $R_{580}$ of the third power supply voltage sensing resistor incorporated into the equation:

$$V_{STANDBY} = N_{SA} \times V_{REF} \left( \frac{\frac{R_{540} \times R_{580}}{R_{540} + R_{580}} + R_{542}}{R_{542}} \right) \quad (2)$$

As illustrated in Equation (2), the bulk voltage $V_{STANDBY}$ generated by the modified primary flyback converter 402 in the standby mode is a second substantially constant voltage that is not affected by the load current through the LED load 110 or the voltage across the LED load. Thus, the modified primary flyback converter does not receive any feedback from the secondary stage flyback converter 410. Rather, the signal on the second output terminal 550 is a simple mode control signal. When the mode control signal is high, the modified primary flyback converter is in standby mode and generates the lower bulk voltage. When the mode control signal is low (e.g., the standby mode signal is inactive), the modified primary flyback converter generates the normal bulk voltage.

In the LED driver 400 of FIG. 2, the secondary stage flyback converter 410 is a non-isolated topology, which allows ground reference sharing between the switch 440 and the LED load 110. This simplifies the control and gate drive designs. The secondary flyback converter electrically positions the LED load outside of the power path of the output of the modified primary flyback converter 402 as applied to the secondary filter capacitor 184. Thus, the LED load is power isolated with respect to the secondary filter capacitor, which provides immunity from the effects of a short circuit of the of the second MOSFET 440. The topology of the LED driver of FIG. 2 allows the second flyback transformer 420 to have a higher primary-to-secondary turns ratio, which allows the bulk $V_{BULK}$ voltage on the secondary filter capacitor 184 to be higher. The higher voltage allows the secondary filter capacitor to have a lower capacitance, which permits a smaller and less expensive electrolytic capacitor to be used. The higher turns ratio of the second flyback transformer allows the flyback transformer 160 to have a 1:1 turns ratio, which allows the use of bifilar windings and which helps to reduce the leakage inductance, power loss and voltage ringing on the first MOSFET 300. In the embodiment of FIG. 2, a low standby power consumption is achieved by controlling the bulk voltage to a lower level when the dimming control input is set to an off state.

Figure 3:
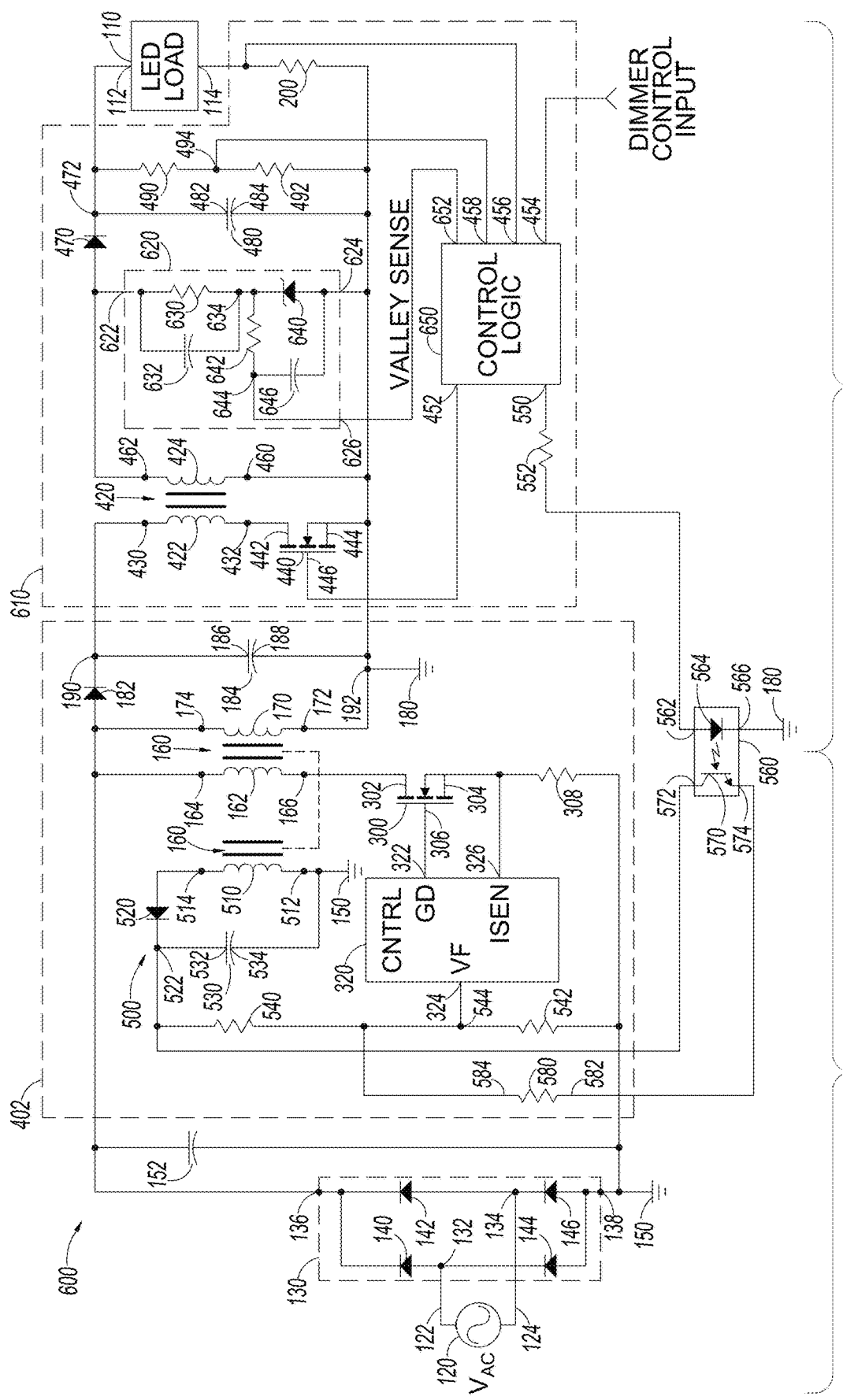
FIG. 3 illustrates a circuit diagram of a further improved LED driver corresponding to the improved LED driver of FIG. 2 and further including a fast valley sensing circuit.

FIG. 3 illustrates an LED driver 600 that incorporates a valley sensing circuit. The LED driver of FIG. 3 includes the modified primary flyback converter 402 in the modified primary section 404, which are described above. The LED driver of FIG. 3 includes a further modified secondary section 606. The further modified secondary section of FIG. 3 includes elements corresponding to the elements of the modified secondary section 406 of FIG. 2, and like elements are identified with the corresponding reference numbers.

The further modified secondary section 606 includes a modified non-isolated secondary stage flyback converter 610 (hereinafter "modified secondary flyback converter 610), which is similar to the non-isolated secondary stage flyback converter 410 of FIG. 2; however, the modified secondary flyback converter of FIG. 3 includes a valley sensing circuit 620. The valley sensing circuit has an input terminal 622 connected to the second terminal 462 of the secondary winding 424 of the second flyback transformer 420. The input terminal of the valley sensing circuit is also connected to the anode of the secondary flyback converter diode 470. The valley sensing circuit has a ground terminal 624 connected to the secondary ground reference 180. The valley sensing circuit has an output terminal 626.

The valley sensing circuit 620 includes a first valley sensing resistor 630 and a first valley sensing capacitor 632, which are connected in parallel between the input terminal 622 of the valley sensing circuit and a first valley sensing node 634. A Zener diode 640 has a cathode connected to the first valley sensing node and has an anode connected to the ground terminal 624. A second valley sensing resistor 642 is connected between the first valley sensing node and a second valley sensing node 644. A second valley sensing capacitor 646 is connected between the second valley sensing node and the ground terminal. The second valley sensing node is also connected to the output terminal 626 of the valley sensing circuit.

In the valley sensing circuit 620, the first valley sensing capacitor 632 senses the negative and positive voltage changes (dV/dt) in a secondary voltage across the secondary winding 424 of the second flyback transformer 420. The first valley sensing resistor 630 maintains a DC voltage level on the second valley sensing capacitor 646 as the secondary voltage changes. The second valley sensing resistor 642 and the second valley sensing capacitor form a high frequency filter. The Zener diode 640 limits the voltage on the first valley sensing node 634 to a magnitude that does not exceed a selected voltage.

The output terminal 626 of the valley sensing circuit 620 generates a VALLEY SENSE signal as described below having a maximum voltage limited by the Zener diode 640. The output terminal of the valley sensing circuit is connected to a fourth input 652 of a modified control logic circuit 650. The modified control logic circuit of FIG. 3 corresponds to the control logic circuit 450 of FIG. 2 and is implemented in one embodiment with the XMC1300 microcontroller as described above. The modified control logic circuit has the first input terminal 454 connected to the dimmer control input, the second input terminal 456 connected to the second terminal 114 of the LED load 110 and the third input terminal 458 connected to secondary voltage sensing node 494 as previously described. The modified control logic circuit of FIG. 3 further includes the output terminal 452 connected to the gate terminal 446 of the second MOSFET 440 and the second output terminal 550 connected to the first input terminal 562 of the optical coupler 560 via the current limiting resistor 552.

The operation of the valley sensing circuit 620 is described below for different modes of operation of the LED driver 600.

Figure 4:
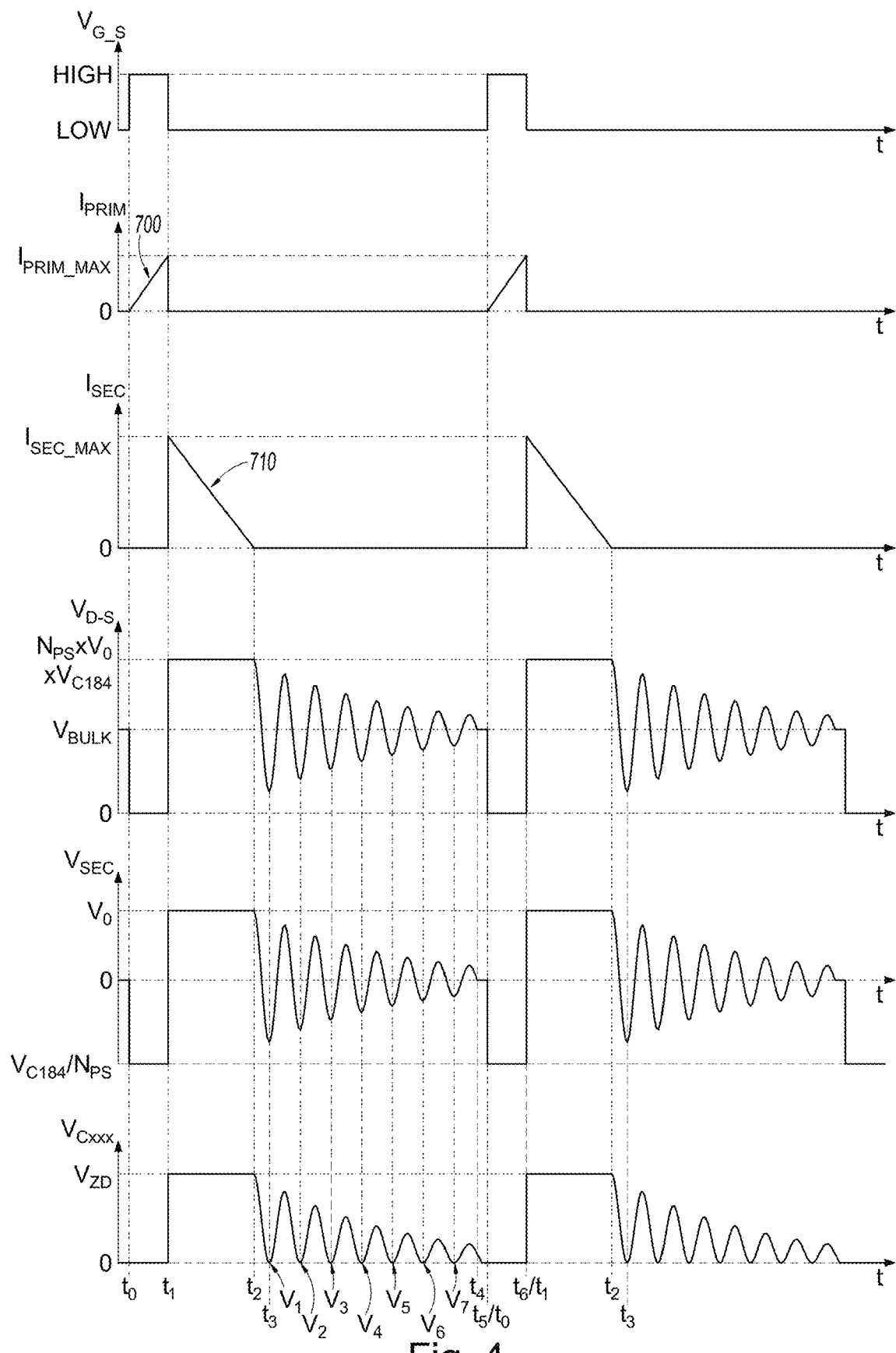
FIG. 4 illustrates waveforms generated by the LED driver of FIG. 3 when the LED driver is operating in a discontinuous mode.

FIG. 4 illustrates six waveforms that explain the operation of the LED driver 600 in an extreme discontinuous mode. A first (uppermost) waveform VGATE in FIG. 4 represents the gate voltage on the gate terminal 446 of the second MOSFET 440. The gate voltage is generated on the first output terminal 452 of the modified control logic circuit 650. As illustrated, the gate voltage is initially low prior to a time to such that the second MOSFET is turned off and no current flows through the second MOSFET. As shown in a second (next-to-uppermost) waveform $I_{PRIM}$ in FIG. 4, the primary current flowing through the primary winding 422 of the second flyback transformer 420 is zero prior to the time to. At the time $t_0$, the modified control logic circuit switches the gate voltage to a high voltage level to turn on the second MOSFET and keeps the second MOSFET on until a time $t_1$. Turning on the second MOSFET allows current to flow through the primary winding of the second flyback transformer caused by the bulk voltage $V_{BULK}$ on the secondary filter capacitor 184. The current charging the primary winding increases to a maximum magnitude $I_{PRIM\_MAX}$ as illustrated by an increasing current ramp 700 of the primary current $I_{PRIM}$ waveform.

During the interval from $t_0$ to $t_1$, a secondary voltage $V_{SEC}$ develops across the secondary winding 424 of the second flyback transformer 420 from the second terminal 462 of the secondary winding to the first terminal 460 of the secondary winding. The secondary voltage has an amplitude of $-V_{BULK}/N_{PS}$, wherein $N_{PS}$ is the ratio of the number of primary turns to the number of secondary turns. The negative secondary voltage reverse biases the secondary flyback converter diode 470. Thus, no current flows through the secondary winding of the second flyback transformer 420. During the interval from the time $t_0$ to the time $t_1$, a voltage $V_{C646}$ across the second valley sensing capacitor 646 is zero because of the negative clamping provided by the Zener diode 640 as shown in the sixth waveform from the top in FIG. 4.

At the time $t_1$, the modified control logic circuit 650 turns off the gate voltage, and the second MOSFET 440 turns off. The abrupt cessation of current flowing through the primary winding 422 of the second flyback transformer causes the transformer to discharge through the secondary winding 424 of the second flyback transformer to generate a secondary current $I_{SEC}$ as illustrated by a third waveform from the top in FIG. 4. The current through the secondary winding has an initial magnitude of $I_{SEC\_MAX}$ and discharges to 0 as represented by a decreasing voltage ramp 710. The initial magnitude of the secondary current is related to the peak magnitude of the primary current as $I_{SEC\_MAX}=I_{PRIM\_MAX} \times N_{PS}$, where $N_{PS}$ is the primary to secondary turns ratio as before. The secondary current decreases to 0 at the time $t_2$. As the secondary current decreases, the decreasing current generates a voltage across the secondary winding that forward biases the secondary flyback converter diode 470 to thereby charge the secondary flyback converter filter capacitor 480 to develop an output voltage $V_{OUT}$ on the secondary flyback converter filter capacitor.

During the interval from the time $t_1$ to the time $t_2$, a voltage $V_{D\_S}$ across the second MOSFET 440 from the drain terminal 442 to the source terminal 444 is the sum of the bulk voltage $V_{BULK}$ across the secondary filter capacitor 184 and a voltage $V_{PRIM}$ across the primary winding of the second flyback transformer. The voltage $V_{PRIM}$ has a magnitude of $V_{OUT} \times N_{PS}$. Thus, the voltage $V_{D\_S}$ has a magnitude of $V_{OUT} \times N_{PS} + V_{BULK}$, as shown in the fourth waveform from the top in FIG. 4.

During the interval from the time $t_1$ to the time $t_2$, the second valley sensing capacitor 646 is charged with via the first valley sensing resistor 630 and the first valley sensing capacitor 632. The voltage $V_{C646}$ across the second valley sensing capacitor is a positive voltage, which is limited by the Zener diode 640 to a voltage $V_{ZD}$ during the interval from the time $t_1$ to the time $t_2$.

When the output voltage $V_{OUT}$ has discharged the secondary winding current $I_{SEC}$ to 0 at the time $t_2$, the primary winding 422 of the second flyback transformer 420 begins ringing because of the drain-to-source parasitic capacitance of the second MOSFET 440 as shown in FIG. 4. The ringing comprises a plurality of minima (valleys) alternating with a plurality of maxima (peaks). The ringing causes the drain-to-source voltage $V_{D\_S}$ of the second MOSFET to decrease from the initial maximum voltage at the time $t_2$ to a first minimum voltage (valley) at a time $t_3$. The ringing continues to ring with subsequent peaks and valleys. The ringing is damped and dies out at a time $t_4$. The duration of the ringing from the time $t_3$ to the time $t_4$ depends in part on the DC resistance of the primary winding of the second flyback transformer.

The ringing of the drain-to-source voltage $V_{D\_S}$ of the second MOSFET 440 during the interval from the time $t_2$ to the time $t_4$ causes a corresponding ringing of the voltage $V_{SEC}$ across the secondary winding 424 of the second flyback transformer 420 as shown in the fifth waveform from the top in FIG. 4. The voltage on the secondary winding causes the second valley sensing capacitor 646 to charge and discharge as shown in FIG. 4. The valley sensing circuit 620 is very effective to cause the voltage on the second valley sensing capacitor to track the ringing waveform on the secondary winding. The first valley sensing capacitor 632 provides a capacitive dv/dt current that forces the voltage on the second valley sensing capacitor to tightly follow the voltage $V_{SEC}$ across the secondary winding. Absent the first valley sensing capacitor, the voltage across the second valley sensing capacitor would lag the voltage $V_{SEC}$ and cause valley sensing timing errors. The voltage on the second valley sensing capacitor appears as a series of positive pulses interposed with signals at 0 volts. The signals at 0 volts are provided as the VALLEY SENSE outputs on the output terminal 626 of the valley sensing circuit 620 and thereby provided to the fourth input terminal of the modified control logic circuit 650.

As shown in FIG. 4, the ringing substantially disappears at the time $t_4$. Between the time $t_4$ and a time $t_5$, the drain-to-source voltage $V_{D\_S}$ of the second MOSFET 440 is equal to the voltage $V_{BULK}$. The secondary winding voltage $V_{SEC}$ is 0 volts. The voltage on the second valley sensing capacitor is 0 volts. Accordingly, the VALLEY SENSING signal is 0 volts. These conditions remain during an interval from the time $t_5$ to a time $t_6$ when the sequence repeats as a second sequence. It should be understood that the time $t_5$ and the time $t_6$ of the second sequence correspond to the time to and the time $t_1$, respectively, of the first sequence.

The first sequence and the second sequence of FIG. 4 illustrate the operation of the modified secondary flyback converter 610 in the discontinuous mode, which is defined by the secondary current through the secondary winding 424 of the second flyback transformer 420 discharging to 0 volts at the time $t_2$ before turning the second MOSFET 440 on.

When the second MOSFET 440 is turned on before the secondary current through the secondary winding 424 of the second flyback transformer 420 completely discharges, the modified secondary flyback converter 610 operates in a continuous mode. The continuous mode produces less ripple; however, the continuous mode causes greater switching losses because the drain-to-source voltage $V_{D\_S}$ across the second MOSFET is not 0 when the switching occurs.

When the second MOSFET 440 is turned on during an interval between the time $t_2$ and the time $t_3$, the modified secondary flyback converter 610 operates in a critical mode of operation. The critical mode of operation is a boundary condition between the continuous mode of operation and the discontinuous mode of operation. The critical mode of operation provides the beneficial feature of soft-switching turn on of the second MOSFET by turning on the second MOSFET when the drain-to-source voltage $V_{D\_S}$ and the secondary voltage $V_{SEC}$ are low during a valley $V_1$ at or near the time $t_3$. The valley $V_1$ and subsequent valleys $V_2$, $V_3$, $V_4$, $V_5$, $V_6$, and $V_7$ are labeled on the VALLEY SENSE waveform in FIG. 4. When the output power provided to the LED load 110 is high, the modified non-isolated secondary stage flyback converter operates in the critical mode of operation to increase the power density. When the output power decreases, the switching frequency increases inversely proportionally to the decrease in power. As the switching frequency increases, high switching losses occur and electromagnetic interference (EMI) issues appear. Thus, high frequency switching is avoided by reducing the switching frequency when the output power to the LED load is low. The switching frequency can be reduced by operating in the above-described discontinuous mode of operation.

When the second MOSFET 440 is turned on after $t_3$ and before $t_5$ while the drain-to-source voltage $V_{D\_S}$ is still ringing the modified secondary flyback converter 610 operates in the discontinuous mode of operation. The discontinuous mode of operations provides low switching losses if the second MOSFET is turned on at or near one of the other valleys $V_2$, $V_3$, $V_4$, $V_5$, $V_6$, and $V_7$ of the VALLEY SENSE waveform in FIG. 4, which coincide with the minima in the drain-to-source voltage $V_{D\_S}$ and the secondary voltage $V_{SEC}$ waveforms in FIG. 4.

Figure 5:
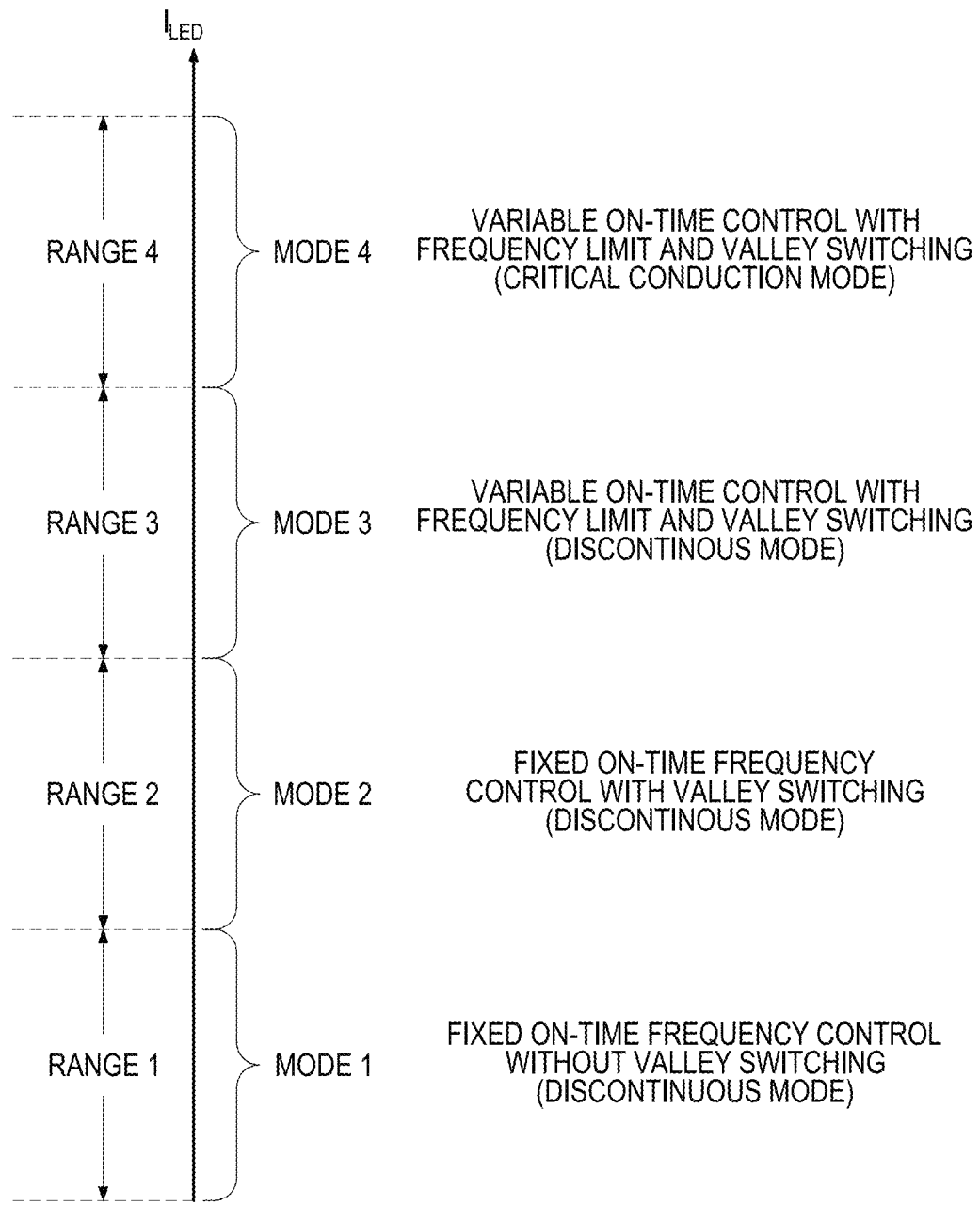
FIG. 5 illustrates a chart of the four operational modes of the LED driver of FIG. 3 based on ranges of the LED current.

The modified secondary flyback converter 610 is controlled across a wide range of LED output current magnitudes by gating the modified secondary flyback converter through four operational modes as illustrated in FIG. 5. In FIG. 5, increasing LED current is represented by a magnitude arrow extended from left to right in the figure. The lowest LED current is at the left; and the greatest LED current is at the right. The first operational mode (MODE 1 in FIG. 5) is enabled at a lowest range of LED current magnitudes. The modified secondary flyback converter is switched to a second operational mode (MODE 2 in FIG. 5) when the LED current magnitudes are in a second range. The modified secondary flyback converter is switched to a third operational mode (MODE 3 in FIG. 5) when the LED current magnitudes are in a third range. The modified secondary flyback converter is switched to a fourth operational mode (MODE 4 in FIG. 5) when the LED current magnitudes are in a fourth range. The first, second, third and four modes of operation are selected as described below.

In the lowest range of LED currents, the modified control logic circuit 650 operates in the operational MODE 1 to control the on-time of the gating signal applied to the gate terminal 446 of the second MOSFET 440 such that the on-time is fixed. The modified control logic circuit varies the period of the gating signal to increase or decrease the LED current in a conventional manner. The gating period is decreased to increase the gating frequency to thereby increase the LED current. The gating period is increased to decrease the gating frequency to thereby decrease the LED load current. During the operational MODE 1, the second MOSFET is turned off for a sufficient time to allow the drain-to-source ringing to dissipate as illustrated in FIG. 4. The modified secondary flyback converter 610 enables the operational MODE 1 when the gating frequency is less than approximately 10 kHz.

As the dimmer control input on the first input terminal 454 is varied to require increased LED current, the modified control logic circuit 650 continues to control the gating signal to the gate terminal 446 of the second MOSFET 440 with a fixed on-time and with increasing gating frequency. When the gating frequency becomes sufficiently high, the drain-to-source ringing will not dissipate prior to switching the second MOSFET on for the next cycle. When this occurs, the modified control logic circuit begins operating in the operational MODE 2 and enables valley switching to reduce switching losses. Enabling valley switching also prevents unintended oscillations of the LED current. If valley switching is not enabled, the second MOSFET could be turned on randomly at a high magnitude peak, a low magnitude valley or at a magnitude between a peak and a valley. Such random switching might cause ripple in the LED current because the supply voltage produced by the modified secondary flyback converter 610 is modified by the magnitude of the oscillation on the gating signal applied to the second MOSFET. This modification effectively changes the gain of the modified secondary flyback converter for each switching cycle. The changes in gain can confuse the control loop by decreasing the output voltage when the modified control logic circuit is trying to increase the LED current or by increasing the output voltage when the control is trying to decrease the LED current. By enabling valley switching during the operational MODE 2, the random switching and the undesired results are prevented.

As the dimmer control input on the first input terminal 454 is varied to require increased LED current, the modified control logic circuit 650 continues to control the gating signal to the gate terminal 446 of the second MOSFET 440 with a fixed on-time and with increasing gating frequency in the operational MODE 2 until the variable frequency control reaches a maximum frequency limit. When the maximum frequency limit is reached, the modified control logic circuit switches to the operational MODE 3 and no longer generates a fixed on-time gating signal. In the operational MODE 3, the modified control logic circuit generates the gating signal with a variable on-time. The modified secondary flyback converter 610 continues to operate in a discontinuous mode with valley switching enabled. The switching frequency is limited by a pulse width modulator (PWM) within the modified control logic circuit. The switching frequency is varied by the modified control logic circuit based on the valley selected to trigger the next active gating signal in an on-time control loop. As described below, the control loop is updated in response to the detected magnitude of the output current $I_{LED}$. The output current can have a 120 Hz ripple, which can cause the modified control logic circuit to switch on different valleys in adjacent switching cycles. This valley skipping can cause additional oscillations in the LED current.

To prevent valley skipping, the modified control logic circuit 650 enables dynamic valley switching in the operational MODE 3 when the valley skipping is detected. When valley skipping is detected, the modified control logic circuit adjusts the switching period limit, and thus adjusts the switching frequency limit, by a small amount to force the valley to occur before or after the time duration for the period limit. As the on-time continues to increase with increasing LED current, the modified control logic circuit moves the time for gating the second MOSFET 440 on to earlier valleys. When the switching occurs at the time $t_3$ corresponding to the first valley V1, the modified control logic circuit causes the modified secondary flyback converter 610 to operate in the critical conduction mode, which is the operational MODE 4 in FIG. 5.

Figure 6:
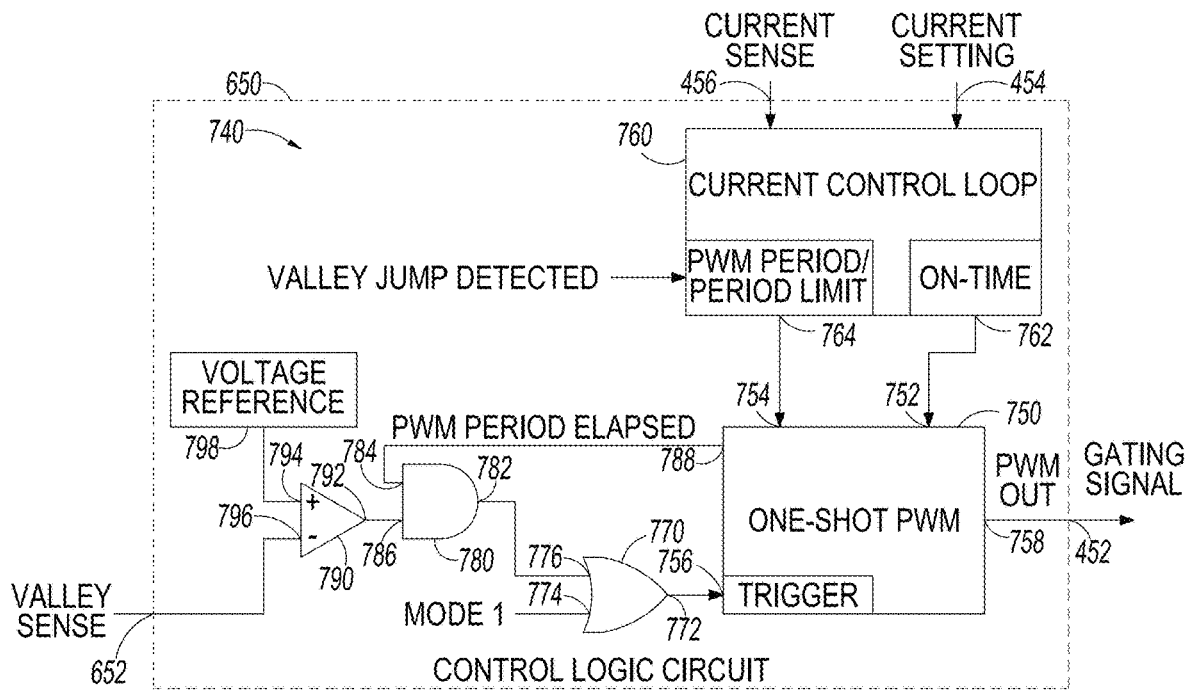
FIG. 6 illustrates a high-level block diagram of a portion of a control loop implemented within the modified control logic circuit of FIG. 3.

FIG. 6 illustrates a high-level block diagram of a portion of a control loop 740 implemented within the modified control logic circuit 650 of FIG. 3. The elements of the control loop can be implemented entirely as microcontroller firmware within a microcontroller (e.g., the illustrated XMC1300 microcontroller) or with combinations of discrete components, microcontroller firmware, field programmable gate arrays (FPGAs), or the like.

The illustrated control loop 740 modifies the on-time and the period of the gating signal on the first output terminal 452 of the modified control logic circuit. The gating signal is applied to the gate terminal 446 of the second MOSFET 440 as described above. The gating signal is generated by a one-shot pulse width modulator (one-shot PWM) 750 within the control loop. The one-shot PWM has a first input 752, a second input 754, a third input 756 and an output 758. The one-shot PWM generates a PWM OUT signal on the output. The PWM OUT signal is also the gating signal on the first output terminal of the modified control logic circuit. The gating signal has an on-time determined by the output of a current control loop 760. The current control loop receives the dimmer control input on the first input terminal 454 of the modified control logic circuit. The current control loop receives the sensed current magnitude signal on the second input terminal 456 of the modified control logic circuit.

The current control loop 760 generates an on-time value on a first output 762 coupled to the first input 752 of the one-shot PWM 750. The value of the on-time signal determines the duration of each gating signal generated by the one-shot PWM. The current control loop generates a PWM period/period limit value on a second output 764 coupled to the second input 754 of the one-shot PWM. The value of the PWM period/period limit signal determines a minimum duration of each period of the gating signal and thus determines a maximum frequency f LIMIT of the gating signal. The duration of a period is increased and the frequency of the gating signal is decreased below the maximum frequency when the triggering of the one-shot PWM is delayed as described below.

The one-shot PWM 750 is responsive to a trigger signal on the third input 756. If the trigger signal is active high when the one-shot PWM ends a previous cycle of the gating signal, the one-shot PWM immediately generates a new cycle of the gating signal. Thus, the one-shot PWM is free running if the trigger signal is always high. If the trigger signal is inactive low when the one-shot PWM ends a previous cycle of the gating signal, the one-shot PWM does not generate a new cycle of the gating signal until the trigger signal again becomes active high. The trigger signal is generated by an output 772 of an OR-gate 770 having a first input 774 and a second input 776. The trigger signal on the output of the OR-gate is high when either the first input or the second input to the OR-gate is high. The first input terminal of the OR-gate is connected to a status signal that is high when the modified secondary flyback converter 610 is in the operational MODE 1 such that the frequency of the gating signal is less than 10 kHz. Thus, when the modified secondary flyback converter is in the operational MODE 1, the one-shot PWM is free running and operates at the present frequency limit.

If the frequency of the gating signal is approximately 10 kHz or greater and the modified secondary flyback converter 610 is no longer in the operational MODE 1, the input on the first input 774 of the OR-gate 770 is no longer high. Thus, the output 772 of the OR-gate is responsive to the signal level on the second input 776 of the OR-gate. The second input of the OR-gate is coupled to an output 782 of an AND-gate 780. The AND-gate has a first input 784 and a second input 786. The first input of the AND-gate is coupled to a PWM ELAPSED signal, which is generated by the PWM one-shot as an active high signal on a second output 788 when the previous cycle of the gating signal has concluded and a new cycle of the gating signal has not started. The second input of the AND-gate is coupled to an output 792 of a valley sensing comparator 790. The comparator has a first non-inverting (+) input 794 and a second inverting (−) input 796. The non-inverting input is coupled to receive a reference voltage from a reference voltage source 798. The inverting input is coupled to receive the VALLEY SENSE signal on the fourth input 652 of the modified control logic circuit 650. When the VALLEY SENSE signal is less than the reference voltage, the output of the comparator will switch to a high level. The combination of the high level on the second input of the AND-gate and the high level on first input of the AND-gate causes the output of the AND-gate to be high. The high output of the AND-gate triggers the one-shot PWM via the OR-gate. Thus, the one-shot PWM is triggered on the first occurrence of a valley after the PWM ELAPSED signal becomes active high. If an active valley occurs before the PWM ELAPSED signal is high, the valley signal is ignored, and the one-shot PWM will be triggered on a subsequent valley signal after the PWM ELAPSED signal switches to a high level. Thus, unless the valley is active when the PWM ELAPSED signal occurs, the present period of the gating signal is increased and the frequency of the gating signal decreases below the present maximum frequency limit $f_{LIMIT}$. As described above, the one-shot PWM is free-running when the operational MODE 1 is active. When the operational MODE 1 is not active (e.g., the modified secondary flyback converter is in the operational MODE 2, the operational MODE 3 or the operational MODE 4), the one-shot PWM operates in a one-shot mode wherein the PWM does not initiate a new cycle until the active VALLEY SENSE signal is received after the end of the previous cycle. Although the functions in FIG. 6 are illustrated as discrete logic gates, it should be understood that the functions can be implemented by other circuitry or by firmware within the modified control logic circuit.

Figure 7:
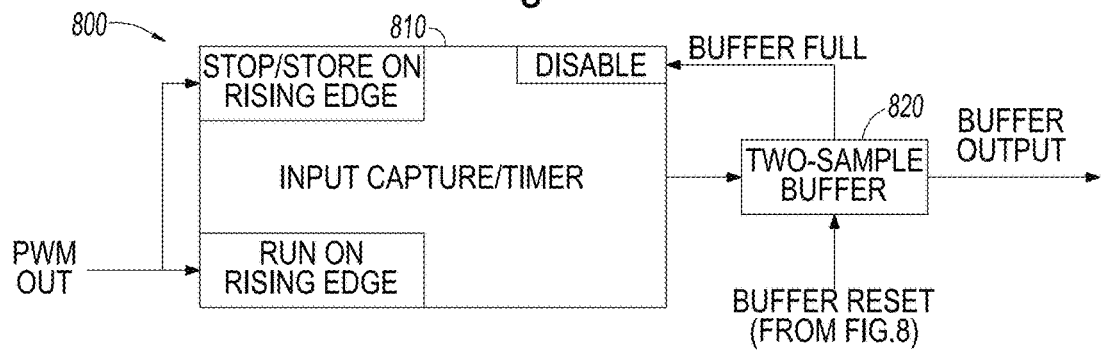
FIG. 7 illustrates a functional block diagram of a first portion of a valley jump detection circuit within the modified control logic circuit of FIG. 3.

FIG. 7 illustrates a functional block diagram of a first portion 800 of a valley jump detection circuit within the modified control logic circuit 650. The first portion of the valley jump detection circuit may be implemented in hardware, in microcontroller firmware or a combination of hardware and firmware. The valley jump circuit receives the PWM OUT signal from the one-shot PWM 750 (FIG. 6). The PWM OUT signal is applied as an input to an input capture/timer 810. The input capture/timer is responsive to a first rising edge of the PWM OUT signal to reset and start an internal counter (timer) The internal counter is driven by a system clock (not shown) that has a much higher frequency than the switching frequency of the modified secondary flyback converter 610. For example, the system clock can have a frequency of 10 MHz or greater.

The input capture/timer 810 is responsive to a second rising edge of the PWM OUT signal to:
 (1) stop the internal counter;
 (2) transfer the count value of the internal counter to a two-sample buffer 820 as a first sample (S[0]);
 (3) reset the internal counter; and
 (4) restart the internal counter.

The input capture/timer 810 is responsive to a third rising edge of the PWM OUT signal to:
 (5) stop the internal counter;
 (6) transfer the count value of the internal counter to the two-sample buffer 820 as a second sample (S[1]);
 (7) set a buffer full signal or flag;
 (7) reset the internal counter; and
 (8) disable the internal counter.

The internal counter within the input capture/timer 810 remains disabled until the two-sample buffer 820 is emptied by reading the two-sample buffer as described below. After the two-sample buffer is emptied and the buffer full signal or flag is turned off, the input capture/timer waits for the next rising edge of the PWM OUT signal and repeats the foregoing steps.

Figure 8:
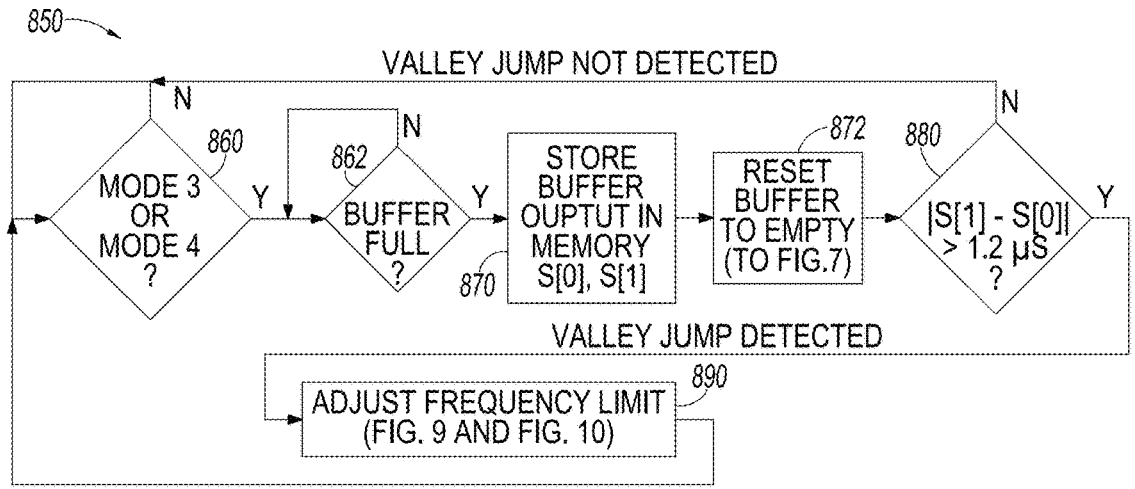
FIG. 8 illustrates a second portion of the valley jump detection circuit of FIG. 7.

FIG. 8 illustrates a second portion 850 of the valley jump detection circuit. In FIG. 8, the second portion of the valley jump detection circuit is illustrated by a flow diagram, which may be implemented in microcontroller firmware, in hardware or in a combination of firmware or hardware. In a first decision block 860, the second portion of the valley jump detection circuit determines whether the modified secondary flyback converter 610 is operating in the operational MODE 3 or the operational MODE 4 wherein the on-time is variable and wherein valley jumping can occur. If the modified secondary flyback converter is not operating in either the operational MODE 3 or the operational MODE 4, the modified secondary flyback converter remains at the first decision block until one of the two operational modes is detected (e.g., the LED current has increased such that the modified secondary flyback converter begins to vary the on-time).

When the second portion 850 of the valley jump detection circuit determines that the modified secondary flyback converter 610 is in the operational MODE 3 or the operational MODE 4, the modified secondary flyback converter proceeds from the first decision block 860 to a second decision block 862 wherein the second portion of the valley jump detection circuit determines whether the two-sample buffer 820 is full. The second portion of the valley jump detection circuit waits at the second decision block until the two-sample buffer is full and then proceeds to a first procedure block 870. In the first procedure block, the two samples S[0] and S[1] of the two-sample buffer are transferred to memory. Then, in a second procedure block 872, a BUFFER RESET signal is sent to the first portion 810 of the valley jump detection circuit to empty the contents of the two-sample buffer. This enables the first portion of the valley jump detection circuit to obtain two new samples in response to the next three rising edges of the PWM OUT signal that occur after the two-sample buffer is read and emptied. It should be understood that the two-sample buffer may be simply overwritten and that "emptying" or resetting of the two-sample buffer is not required.

After storing the two samples in the first procedure block 870 and sending the BUFFER RESET signal in the second procedure block 872, the second portion 850 of the valley jump detection circuit proceeds to a third decision block 880 wherein the absolute difference between the values of the two samples S[0] and S[1] is compared to a threshold difference. For example, in the illustrated embodiment, the threshold difference is a count value corresponding to approximately 1.2 microseconds. If the absolute difference between the two samples is not greater than the threshold difference, a valley jump is not detected; and the second portion of the valley jump detection circuit returns from the third decision block to the first decision block 860 to first confirm that the modified secondary flyback converter 610 is still operating in the operational MODE 3 or the operational MODE 4. If the modified secondary flyback converter is one of the two operational modes, the second portion of the valley jump detection circuit proceeds to the second decision block 862 to wait for the next active BUFFER FULL signal.

Figure 9:
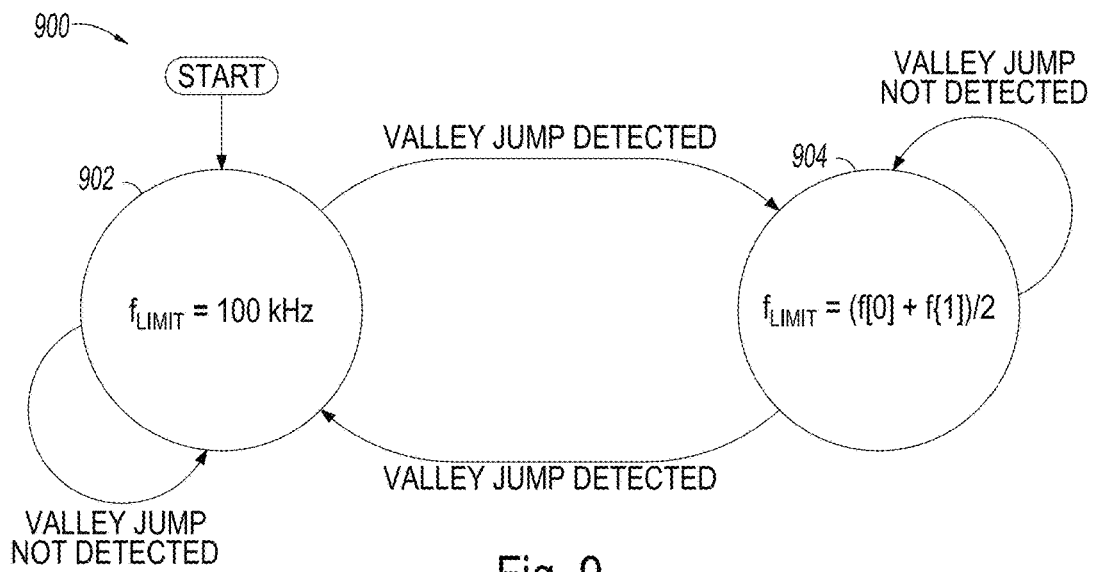
FIG. 9 illustrates a first frequency adjustment routine that can be used with the second portion of the valley jump detection circuit of FIG. 8.
Figure 10:
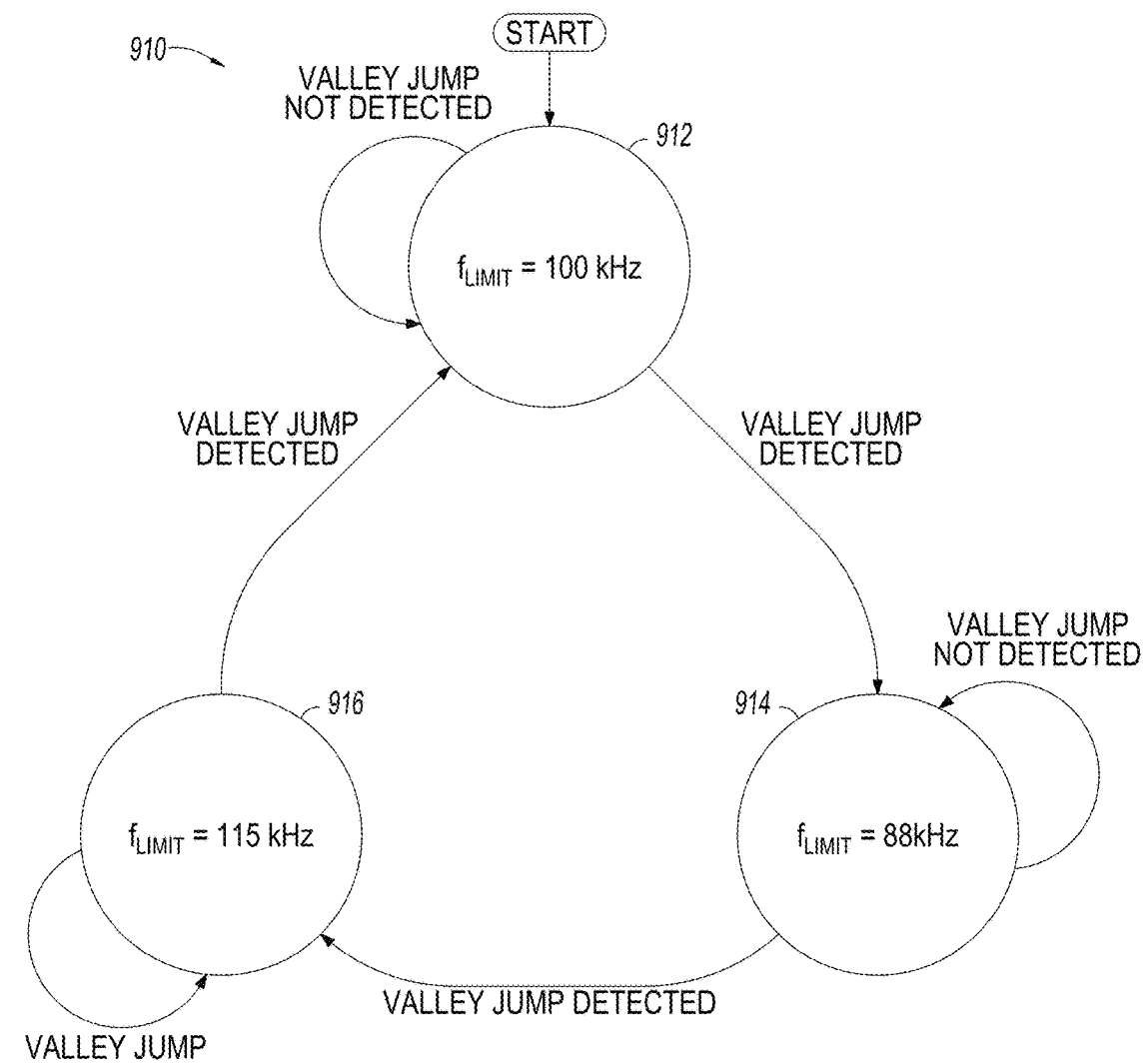
FIG. 10 illustrates a second frequency adjustment routine that can be used with the second portion of the valley jump detection circuit of FIG. 8.

If the absolute difference between the two samples S[0] and S[1] stored in the two-sample buffer 820 is greater than the threshold difference (e.g., a count corresponding to a time greater than 1.2 microseconds), the second portion 850 of the valley jump detection circuit has detected a valley jump in the third decision block 880. For example, a valley jump is detected if the modified secondary flyback converter 610 switches on the third valley $V_3$ during one switching cycle and then switches on the second valley $V_4$ in the next switching cycle. A valley jump is also detected if the modified secondary flyback converter switches on the third valley $V_3$ during one switching cycle and then switches on the second valley $V_2$ in the next switching cycle. The detection of a valley jump causes the second portion of the valley jump detection circuit to proceed from the third decision block to a procedure block 890, wherein the modified secondary flyback converter adjusts a maximum frequency limit of the switching frequency to prevent further jumping around the present operating point. Two procedures for adjusting the maximum frequency limit are illustrated in FIG. 9 and FIG. 10 as described below. The second portion of the valley jump detection circuit can operate periodically or as needed. If the second portion of the valley jump detection circuit operates periodically, it does not operate faster than every two switching cycles, which is the time required to obtain two new samples in the two-sample buffer.

FIG. 9 illustrates a first frequency adjustment routine 900. The first frequency adjustment routine has a first state 902 and a second state 904. The first frequency adjustment routine is initialized in the first state. In the first state, the maximum frequency limit is set to a predetermined frequency based on the switching characteristics of the modified secondary flyback converter 610. For example, in the illustrated embodiment, the initial maximum frequency limit is set to 100 kHz. The first frequency adjustment routine remains in the first state until a valley jump is detected by the second portion 850 of the valley jump detection circuit of FIG. 8. The detection of a valley jump can be indicated by a signal level, a firmware flag or other valley jump indicator.

When a valley jump is detected by the second portion 850 of the valley jump detection circuit when the first frequency adjustment routine is in the first state 902, the first frequency adjustment routine advances to the second state 904. In the second state, the first frequency adjustment routine changes the maximum frequency limit to a new value determined by the two samples S[0] and S[1]. Each sample corresponds to the duration T[0] and T[1] of a respective switching period. Each sample can be converted to a respective switching period by multiplying the sample count by the sample period (sample interval). A corresponding switching frequency is obtained by taking the reciprocal of the switching period (e.g., f[0]=1/T[0]; f[1]=1/T[1]). For example, if the internal counter is driven by 10 MHz clock, each sampling interval is 0.1 microsecond. A sample count of 100 corresponds to a switching period of 10 microseconds, which corresponds to a switching frequency of 100 kHz. A sample count of 125 corresponds to a switching period of 12.5 microseconds, which corresponds to a switching frequency of 80 kHz. The new maximum frequency limit is $f_{LIMIT\_NEW}$ calculated as the average of the two frequencies (e.g., $f_{LIMIT\_NEW}=(f[0]+f[1])/2$). Changing the maximum frequency limit to this new average frequency is intended to set the new period limit to be at or near the peak between the two valleys represented by the two samples. This forces the PWM to trigger on the later of the two valleys.

When valley jumping is detected while the first frequency adjustment routine 900 is in the second state 904, the first frequency adjustment routine returns to the first state 902 wherein the first frequency adjustment routine resets the maximum frequency limit to the initial value (e.g., 100 kHz in the illustrated embodiment). The valley jumping continues on subsequent occurrences of the valley jump detection such that the first frequency adjustment routine changes the maximum frequency limit between the base frequency limit and the modified frequency limit and between the modified frequency limit and the base frequency limit on alternating occurrences of the valley jump detection. This jumping back and forth between a longer period and a shorter period causes the modified secondary flyback converter 610 to be gated on earlier and earlier valleys as the on-time increases with increasing LED current demands until the modified secondary flyback converter switches on the first valley $V_1$ for the critical conduction mode in the operational MODE 4.

FIG. 10 illustrates a second frequency adjustment routine 910. The second frequency adjustment routine has a first state 912, a second state 914 and a third state 916. The second frequency adjustment routine is initialized in the first state wherein the maximum frequency limit is set to a predetermined frequency based on the switching characteristics of the modified secondary flyback converter 610. For example, in the illustrated embodiment, the initial maximum frequency limit is set to 100 kHz. The second frequency adjustment routine remains in the first state until a valley jump is detected by the second portion 850 of the valley jump detection circuit of FIG. 8.

When a valley jump is detected by the second portion 850 of the valley jump detection circuit when the second frequency adjustment routine 910 is in the first state 912, the second frequency adjustment routine advances to the second state 914. In the second state, the second frequency adjustment routine changes the maximum frequency limit to a new value at a new frequency lower than the initial frequency (e.g., 88 kHz in the illustrated embodiment). If a valley jump is detected while in the second state, the second frequency adjustment routine advances to the third state 916. In the second state, the second frequency adjustment routine changes the maximum frequency limit to a new maximum frequency limit higher than the initial maximum frequency limit (e.g., 115 kHz in the illustrated embodiment). If a valley jump is detected while the second frequency adjustment routine is in the third state, the second frequency adjustment routine returns to the first state. The foregoing pattern of state changes continues with subsequent detections of valley jump signals. The changes in the maximum frequency limit above and below the initial 100 kHz maximum frequency limit helps prevent valley jumping that might occur if the adjustment routine cycled only between two frequency limits. The adjustments to the maximum frequency limit cause the switching to occur at or near a peak between two valleys, which forces the modified secondary flyback converter 610 to generate a new gating signal on one of the two valleys.

Figure 11:
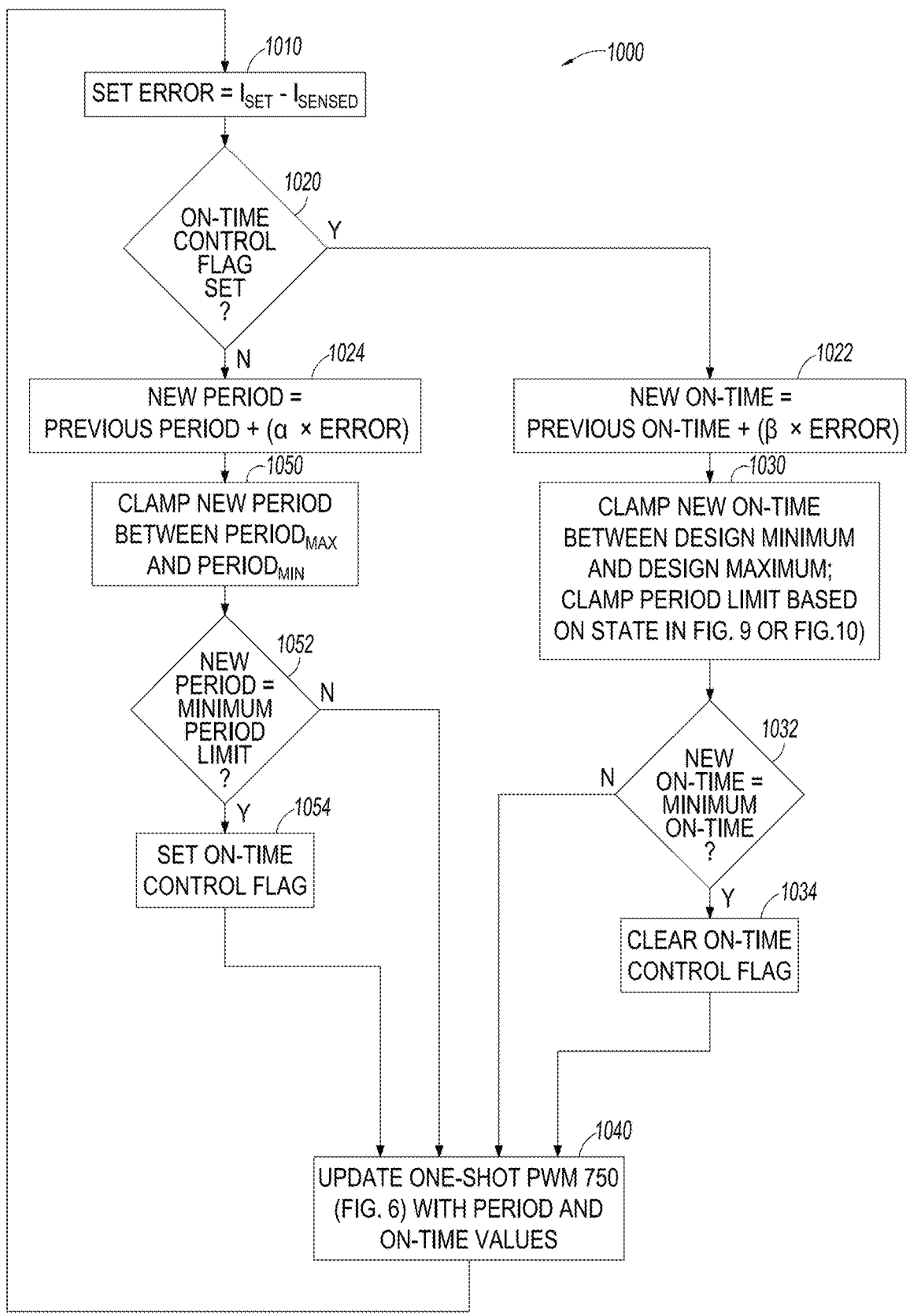
FIG. 11 illustrates a flow chart of a control loop decision-making process implemented by the current control loop of FIG. 6

FIG. 11 illustrates a flow chart of a control loop decision-making process 1000 implemented by the current control loop 760 of FIG. 6. The decision-making process adjusts the on-time and the gating period of the gating signal applied to the gate terminal 446 of the second MOSFET 440. As described below, the process selects one of fixed on-time discontinuous switching, variable on-time discontinuous switching and variable on-time critical conduction based on the present switching state and the difference between the sensed current and the set current (e.g., the current set by the dimming control input on the first input terminal 454 of the modified control logic circuit 650).

In a first procedure block 1010, the control loop decision-making process 1000 sets an error value to a difference between the set current $I_{SET}$ and a sensed current $I_{SENSED}$ (e.g., ERROR=$I_{SET}$-$I_{SENSED}$). After setting the error value, the process proceeds to a on-time control flag check decision block 1020, wherein the process checks an on-time control flag to determine whether the process is presently operating under on-time control (variable on-time and fixed period) or under period control (e.g., fixed on-time and variable period). If the on-time control flag is set, which indicates that the process is operating with on-time control, the process proceeds to a set new on-time procedure block 1022. If the on-time control flag is not set, which indicates that the process is not operating with on-time control, the process proceeds to a set new period procedure block 1024.

If the control loop decision-making process 1000 is operating with on-time control, the process sets a new on-time in the set new on-time procedure block 1022 by changing the previous on-time by the error value (as determined in the first procedure block 1010) multiplied by a coefficient 13. The coefficient 13 is a gain value, which is selected to scale the computed error to the units of the one-shot PWM 750 and to provide a suitable loop gain to attenuate 120 Hz ripple. Since the error value may be positive or negative, the previous on-time can be increased or decreased in the new on-time procedure block.

After setting the new on-time in the set new on-time procedure block 1022, the control loop decision-making process 1000 proceeds to a new on-time clamping procedure block 1030 wherein the process clamps the new on-time value to a value between a design minimum value and a design maximum value for the on-time value. If the new on-time value is less than the design minimum value, the new on-time value is increased to the design minimum value. If the new on-time value is greater than the design maximum value, the new on-time value is reduced to the design maximum value. The design minimum on-time value and the design maximum on-time value are determined in part by the characteristics of the one-time PWM 750. If the new on-time value is between the minimum on-time value and the maximum on-time value, no clamping occurs. Within the new on-time clamping procedure block, the process also clamps the period limit based on the state in FIG. 9 or FIG. 10 determined by valley jump detection.

After clamping the new on-time value, if necessary, the control loop decision-making process 1000 proceeds to an on-time comparison decision block 1032 wherein the new on-time is compared to a minimum on-time. If the new on-time is equal to the minimum on-time, the process proceeds to a procedure block 1034 wherein the process clears the on-time flag because the one-shot PWM 750 can no longer be controlled by adjusting the on-time below the minimum on-time. After clearing the on-time flag, the process proceeds to a value updating procedure block 1040 (described below). If the new on-time value is greater than the minimum on-time, the process proceeds directly from the on-time comparison decision block to the value updating procedure block.

If the on-time control flag is not set when checked in the on-time control flag check decision block 1020, the control loop decision-making process 1000 proceeds to the set new period procedure block 1024 wherein the process sets a new period equal to the previous period changed by the error value (as determined in the first procedure block 1010) multiplied by a coefficient α. The coefficient α is a gain value, which is selected to scale the computed error to the units of the one-shot PWM 750 and to provide a suitable loop gain to attenuate 120 kHz ripple. Since the error value may be positive or negative, the previous period can be increased or decreased in the new period procedure block.

After calculating the new period in the set new period procedure block 1024, the control loop decision-making process 1000 proceeds to a new period clamping procedure block 1050 wherein the process clamps the new period value to a value between a minimum system value of the period and a maximum period value. If the new period value is less than the minimum period value (corresponding to a maximum switching frequency), the new period value is increased to the minimum period value. If the new period value is greater than the maximum period value (corresponding to a minimum switching frequency), the new period value is reduced to the maximum period value. The minimum period value and the maximum period value are determined in part by the characteristics of the modified secondary flyback converter 610. If the new period value is between the minimum and maximum period values, no clamping occurs.

After clamping the new period value, if necessary, the control loop decision-making process 1000 proceeds to a new period comparison decision block 1052 wherein the new period is compared to a minimum period limit. The minimum period limit corresponds to the present maximum frequency limit $f_{LIMIT}$ as set in the first frequency adjustment routine 900 of FIG. 9 or as set in the second frequency adjustment routine 910 of FIG. 10. If the new period is equal to the minimum period limit, the process proceeds to a procedure block 1054 wherein the process sets the on-time flag because the one-shot PWM 750 can no longer be controlled by adjusting the period below the minimum period limit, which would cause the switching frequency to exceed the present maximum frequency limit. Because the frequency cannot be increased beyond the present maximum frequency limit, the process sets the on-time flag to return to on-time control. After setting the on-time flag, the process proceeds to the value updating procedure block 1040. If the new period value is greater than the minimum on-time, the process proceeds directly from the period comparison decision block to the value updating procedure block.

In the value updating procedure block 1040, the control loop decision-making process 1000 updates the one-shot PWM 750 with either a newly calculated on-time value or a newly calculated period value or both in accordance with the process path selected by the on-time control flag check decision block 1020. The process then returns to the first procedure block 1010 to determine a new error value before repeating the process as described above. The control loop decision-making process can run a fixed interval or at a variable interval; however, the process cannot run at an interval shorter than the present period of the one-shot PWM.

The foregoing description is directed to the operation of the LED driver 600 after starting up and achieving operating conditions. The following description is directed to the startup operation of the LED driver when initially powered on. During initial startup, the modified secondary flyback converter 610 performs selected operations and verifies selected conditions to assure the proper operation of the LED driver. The modified secondary flyback converter tests for an open circuit in the LED load 110. The modified secondary flyback converter tests for a short circuit in the LED load. The modified secondary flyback converter achieves normal operating conditions within 700 milliseconds after receiving power. The modified secondary flyback converter ramps up smoothly from 0 current to full operating current with minimum turn-on current overshoot and no startup flash of the LED load. During startup, the modified secondary flyback converter limits the on-time of the second MOSFET 440 to thereby limit the maximum current through the primary winding 422 of the second flyback transformer 420 and through the second MOSFET from the drain to the source. The modified secondary flyback converter limits the maximum operating frequency to thereby limit the switching losses and to improve the efficiency of operation. The modified secondary flyback converter turns on the second MOSFET during valleys, as described above, to reduce turn-on switching losses. The modified secondary flyback converter maintains the low frequency ripple (e.g., less than 120 Hz) on the LED output current at less than 5 percent by setting the control loop crossover frequency at greater than 1 kHz. The modified secondary flyback converter operates at the critical conduction mode (MODE 4) at full power to improve the power density and efficiency. The LED driver maintains a low standby power by setting the bulk voltage $V_{BULK}$ to a low level as described above.

The foregoing operations and conditions are achieved by configuring the modified control logic circuit 650 to perform the following operations. At initial power on, the modified control logic circuit enables dimming sensing in response to the dimmer control input on the first input terminal 454. If the dimmer control input has a value indicating that the LED load 100 is off, the modified control logic circuit turns on the optical coupler 560 to cause the modified primary flyback converter 402 to set the bulk output voltage $V_{BULK}$ to the standby voltage $V_{STANDBY}$ as described above. If the dimmer control input is not at an off level, the modified control logic circuit turns off the optical coupler so that the modified primary flyback converter sets the bulk output voltage to the normal level. The modified control logic then starts the LED turn-on sequence described below.

At the beginning of the LED turn-on sequence, the modified control logic 650 sets the on-time of the second MOSFET 440 to a minimum duration (e.g., approximately 800 nanoseconds in the illustrated embodiment). The modified control logic sets the switching frequency at a low frequency (e.g., approximately 3 kHz in the illustrated embodiment). The modified control logic performs output short testing (described below). If the LED load 110 or other portions of the output circuit are not shorted, the output voltage $V_{OUT}$ as measured via the secondary voltage sensing node 494 should be greater than 5 volts. The voltage is sufficiently low that only a few hundred milliamps of current flows even if the output is shorted.

If the output voltage is greater than 5 volts, which confirms that the output circuit is not shorted, the modified control logic 650 sets the on-time and the switching frequency to respective greater values. For example, in the illustrated embodiment, the on-time is set to approximately 1.5 times the minimum on-time (e.g., 1,500 nanoseconds), and the frequency is set to approximately 16 kHz. The on-time and frequency are selected to charge the secondary flyback converter filter capacitor 480 rapidly to reduce the startup time. While the secondary flyback converter filter capacitor is charging, the modified control logic checks for an open condition in the output circuitry. Although the LED load 110 is not forward biased sufficiently to cause enough current to flow to illuminate the LEDs, a small current flows (e.g., approximately 1 milliamp) that is measurable to confirm that the output is not open circuited. The voltage across the LED load is measured and is used to set parameters as described below. The secondary flyback filter capacitor charges slowly relative to the switching frequency so that the LED current is detectable before exceeding the minimum output current rating. When the small output current is detected, the modified control logic dynamically resets the on-time to the minimum on-time (e.g., 800 nanoseconds in the illustrated embodiment) to speed up the process of ramping up the current. The modified control logic also resets the frequency to a lower value (e.g., 1.5 kHz) to start the current ramping up and to avoid pumping too much energy too quickly through the LED load 110. The two reset procedures minimize startup current overshoot and minimize startup flash of the LEDs.

After resetting the on-time and the frequency to the minimum values, the modified control logic 650 begins increasing the frequency to increase the current through the LED load 110 to the setting determined by the dimmer control input on the first input terminal 454. When the frequency reaches a selected frequency (e.g., 10 kHz), the modified control logic enables valley sensing and enables valley turn-on of the second MOSFET 440 (as described above) to reduce switching losses.

When the frequency reaches a maximum frequency (e.g., 100 kHz), the modified control logic 650 fixes the frequency and increases the on-time to further increase the current to the LED load 110. From this point on, the modified control logic turns on the second MOSFET 440 during the first valley $V_1$ of the drain-to-source voltage to force the modified secondary flyback converter 610 to operate in the critical conduction mode (MODE 4), as described above, to further improve the efficiency of the modified secondary flyback converter.

When the current through the LED load 110 reaches the target LED current set by the dimmer control input to the first input terminal 454 of the modified control logic 650, the modified control logic continuously monitors the dimmer control input signal and regulates the current through the LED load according to the value of the signal.

Figure 12A:
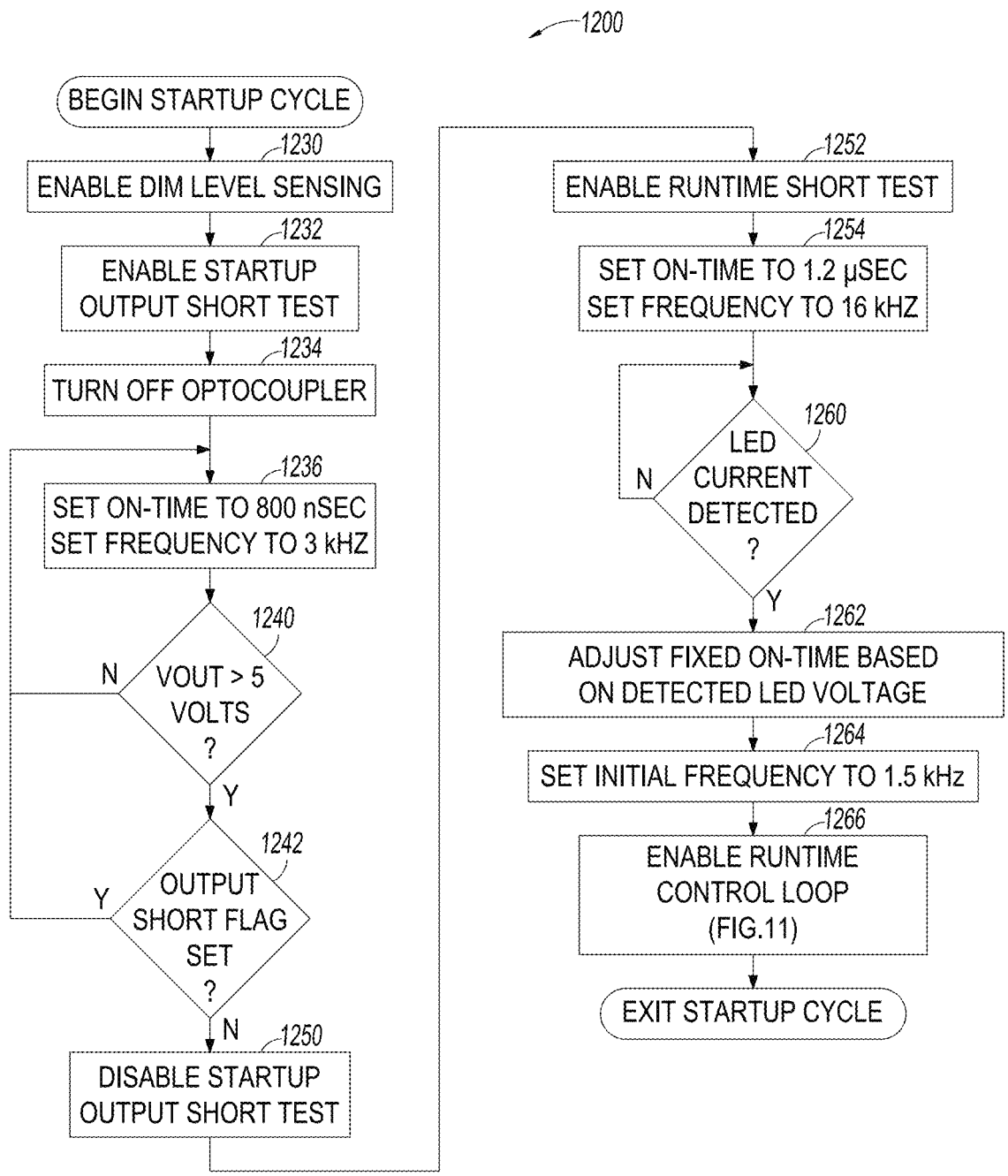
FIG. 12A illustrates a startup process that initiates the operation of the modified control logic to turn on the LED load of FIG. 3 in a controlled manner prior to enabling the runtime control loop decision-making process of FIG. 11.
Figure 12B:
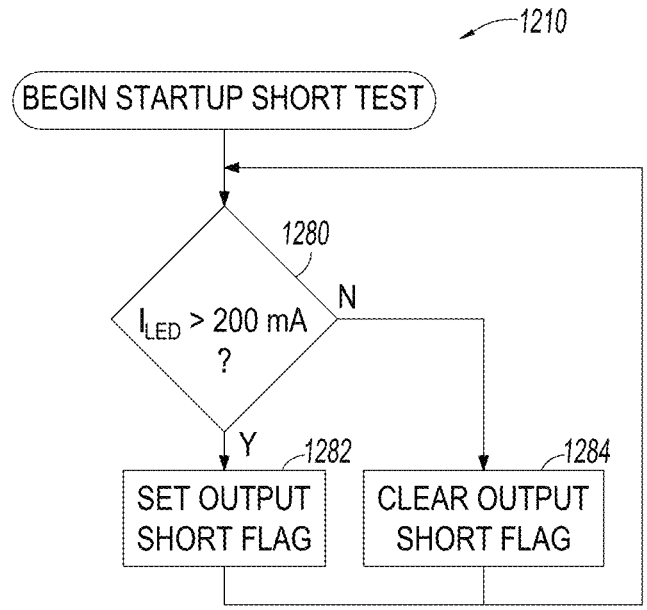
FIG. 12B illustrates a startup short circuit test enabled by the startup process of FIG. 12A that tests for a short circuit in the LED load prior to enabling operational on-time and operational switching frequencies to the gating pulses that determine the voltages generated in the LED driver during a first stage of the startup process.
Figure 12C:
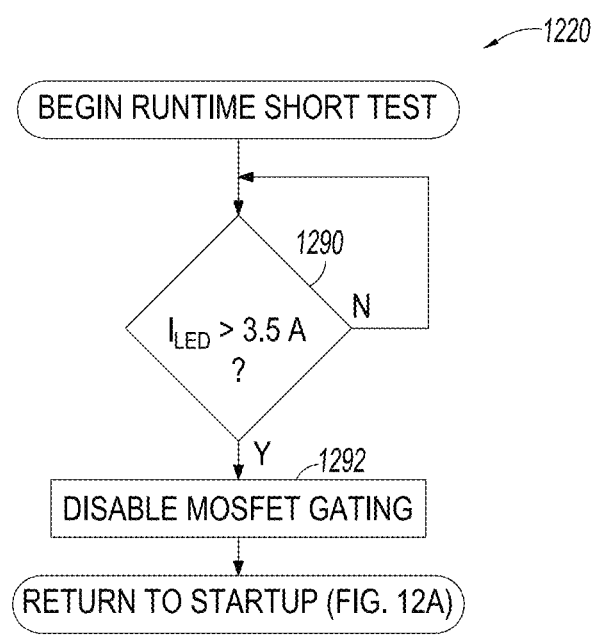
FIG. 12C illustrates a runtime short circuit test enabled by the startup process of FIG. 12A that continually tests for a short circuit in the LED load during a second stage of the startup process and while the LED driver is being controlled by the control loop decision-making process of FIG. 11.

The foregoing can be further understood in connection with the flow chart illustrated in FIGS. 12A, 12B and 12C, which illustrate a startup process 1200, a startup short circuit test process 1210 and a runtime short circuit test process 1220, respectively. In a first procedure block 1230 in a first stage of the startup process, the startup process enables sensing of the dimmer control input on the first terminal 454 of the modified control logic 650. In a second procedure block 1232, the startup process enables the startup short circuit test process of FIG. 12B, which is described below. The startup short circuit test process runs asynchronously with the startup process and continues until disabled. In a third procedure block 1234, the startup process turns off the optical coupler 560 if the value of the dimmer control input is not set to a value corresponding to the off state. In an initial on-time and frequency setting procedure block 1236, the startup process sets the on-time to a minimum on-time (e.g., 800 nanoseconds) and sets the frequency to a low frequency (e.g., 3 kHz). The frequency is sufficiently high to quickly develop 5 volts on the secondary flyback converter filter capacitor 480, which is unloaded because the LED load 110 is not forward biased and thus appears as an open circuit. The frequency is sufficiently low that only a few hundred milliamps of current will flow if the output circuit is shorted.

The startup process 1200 then checks the output voltage ($V_{OUT}$) in a voltage check decision block 1240. If the output voltage is not greater than 5 volts, the startup process to the initial on-time and frequency setting procedure block 1236 wherein the modified control logic 650 again sets the on-time to 800 nanoseconds and sets the frequency to 3 kHz. The startup process then returns to the voltage check decision block 1240 to again check the magnitude of the output voltage. The startup process remains in this loop until the output voltage exceeds 5 volts. When the output voltage exceeds 5 volts, the startup process advances from the voltage check decision block to a short circuit flag decision block 1242 wherein the startup process checks whether the asynchronously running startup output short circuit test process 1210 of FIG. 12B has set an output short circuit flag. If the output short circuit flag is set, the startup process advances to the on-time and frequency reset procedure block and continues to loop until the output short circuit flag is cleared.

If the output short circuit flag is not set when checked in the short circuit flag decision block 1242, the startup process 1200 advances from the short circuit flag decision block to a disable startup output short circuit test procedure block 1250 wherein the startup process disables the startup output short circuit test process 1210 of FIG. 12B to complete the first stage of the startup process. If the startup output short circuit test process is a firmware process, the firmware process can be stopped. If the startup output short circuit test process is a hardware process, as described below for example, the modified control logic 650 stops checking for flags from the startup short circuit test process.

After disabling the startup output short circuit test process 1210 in the disable startup output short circuit test procedure block 1250 to end the first stage of the startup process, the startup process 1200 advances to an enable runtime short circuit test procedure block 1252 to begin a second stage of the startup process. In the enable runtime short circuit test procedure block, the startup process enables the runtime short circuit test process 1220 of FIG. 12C. Once started, the runtime short circuit test process runs asynchronously as described below.

After enabling the runtime short circuit test process 1220, the startup process 1200 advances to a runtime on-time and frequency setting procedure block 1254 wherein the startup process sets the on-time value to 1.2 microseconds (1,200 nanoseconds) and sets the frequency to 16 kHz. The two settings are selected to rapidly charge the secondary flyback converter filter capacitor 480 while the LED load 110 still looks like an open circuit because the LEDs are not yet forward biased. The two settings are sufficient to establish a load current greater than a minimum current for the LED load 110. The secondary flyback converter filter capacitor charges relatively slowly compared to the switching frequency so that the increasing LED current can be detected before exceeding the minimum output current rating of the LED driver 600. One or both control signals are reduced when LED current is detected to thereby prevent overshoot of the minimum current setting.

After enabling the runtime short circuit test process 1220 and after setting the runtime on-time and frequency values in the runtime on-time and frequency setting procedure block 1254, the startup process advances to an LED current detection decision block 1260 wherein the startup process determines whether an LED current is detected. If an LED current is not detected, the startup process continues to loop at the LED current detection decision block. If an LED current is detected, the startup process advances to an on-time adjustment block 1262 where the startup process responds to the magnitude of the detected LED voltage $V_{LED}$ to compute a new on-time value for frequency control in the discontinuous mode. The startup process then sets an initial runtime frequency to 1.5 kHz in a set initial runtime frequency procedure block 1264. The startup process then enables the runtime control loop decision-making process 1000 of FIG. 11 in an enable runtime control procedure block 1266, which ends the second stage of the startup process and completes the startup process.

The startup short circuit test process 1210 of FIG. 12B, which runs during the startup sequence in the first stage of the startup process 1200, prevents the modified secondary flyback converter 610 from attempting to ramp up the output current into a short circuit, which would quickly cause failure of the second MOSFET 440. As illustrated functionally in FIG. 12B, the startup short circuit test process includes a current test decision block 1280 in which the process monitors the output current continuously until the startup process 1200 begins ramping up the output current. If the output current is greater than 200 milliamperes when monitored in the current test decision block, a startup short circuit flag is set in a procedure block 1282, and the startup short circuit test process returns to the current test decision block. If the output current is not greater than 200 milliamperes, the startup short circuit flag is cleared in a procedure block 1284, and the startup short circuit test process returns to the current test decision block 1280. As discussed above, the startup short circuit test process continues to run until disabled by the startup process 1200. If an output short circuit is detected at startup, the gating of the second MOSFET is maintained at a level that is safe for continuous operation until power is turned off or the output short is removed. Since the startup short circuit test runs continuously during startup, the test can detect a short that occurs after the initial startup sequence begins.

The runtime short circuit test process 1220 is illustrated functionally in FIG. 12C. Once enabled by the startup process 1200 in the second stage of the startup process, the runtime short circuit test process operates continuously to monitor the output current after a significant output voltage is established on the secondary flyback converter filter capacitor 480. The runtime short circuit test process continues to run after the second stage of the startup process is completed and the modified control logic 650 is operating in accordance with the control loop decision-making process 1000.

The runtime short circuit test process 1220 includes a runtime current test decision block 1290 in which the process continuously monitors the output current compares the output current to 3.5 amps (3,500 milliamps). If the output current is not greater than 3.5 amps the runtime short circuit test process loops back to the runtime current test decision block and continues to monitor the output current. If the output current is greater than 3.5 amps, the runtime short circuit test process advances to a disable MOSFET gating procedure block 1292 wherein the gating signal to the second MOSFET 440 is disabled (e.g., the on-time is set to 0) to prevent further operation of the second MOSFET. Because of the large capacitance of the secondary flyback converter filter capacitor, current spikes through a short circuit in the output can be quite large while the capacitor is discharging. The current spike is not applied directly to the second MOSFET; however, the second MOSFET will fail quickly if the second MOSFET continues to switch with a large on-time into a shorted secondary winding 424 of the second flyback transformer 420. The runtime short circuit test detects the large current spike, and the modified control logic stops the switching of the second MOSFET immediately. The modified control logic returns the control sequence to the startup state wherein the switching is maintained at a safe low level (e.g., minimum on-time and a low frequency) until the short is removed.

Figure 13A:
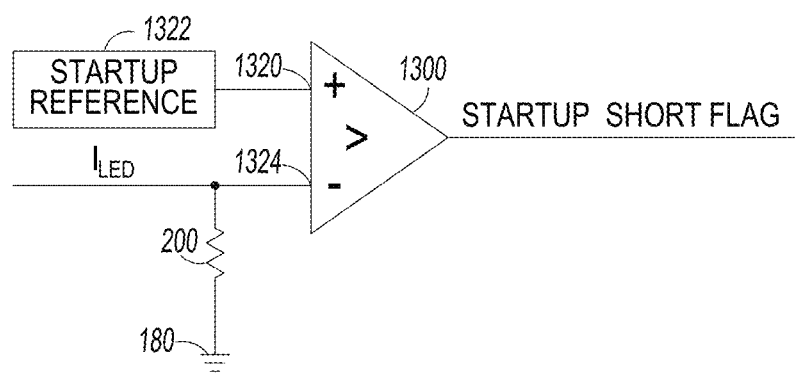
FIG. 13A illustrates a comparator that can be used to implement the startup short circuit test of FIG. 12B.
Figure 13B:
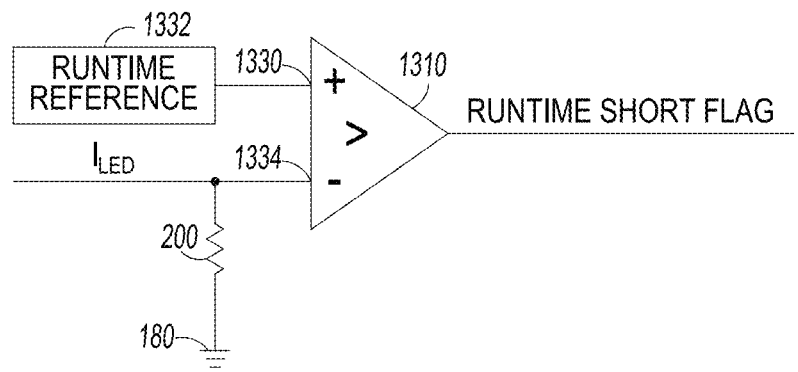
FIG. 13B illustrates a comparator that can be used to implement the runtime short circuit test of FIG. 12C.

The startup short circuit test process 1210 and the runtime short circuit test process 1220 are illustrated functionally in FIG. 12B and FIG. 12C, respectively. The two test processes can be implemented in firmware within the modified control logic 650; however, in an illustrated embodiment, the startup short circuit test process is implemented in hardware as a startup current comparator 1300 as illustrated in FIG. 13A; and the runtime short circuit test process is implemented as a runtime current comparator 1310 as illustrated in FIG. 13B. In the illustrated embodiment, the two current comparators are implemented within the modified control logic 650; however, either or both of the two current comparators can be implemented as separate circuits.

The startup current comparator 1300 has a noninverting (+) input 1320, which is connected to a startup reference voltage source 1322, which provides a reference voltage at a startup reference voltage magnitude. The startup current comparator has an inverting (−) input 1324, which is connected to the secondary current sensing resistor 200. The voltage across the secondary current sensing resistor has a magnitude proportional to the magnitude of the output current. The startup reference voltage magnitude is selected to correspond to the voltage developed across the secondary current sensing resistor when an output current of approximately 200 milliamps flows through the secondary current sensing resistor. When the output current exceeds 200 milliamps, the output of the startup current comparator switches state and generates a startup short circuit detected interrupt (startup short flag) to the modified control logic 650. The modified control logic can react immediately to the startup short circuit interrupt to stop the startup sequence until the short circuit is cleared.

The runtime current comparator 1310 has a noninverting (+) input 1330, which is connected to a runtime reference voltage source 1332, which provides a reference voltage at a runtime reference voltage magnitude. The runtime current comparator has an inverting (−) input 1334, which is also connected to the secondary current sensing resistor 200. The runtime reference voltage magnitude is selected to correspond to the voltage developed across the secondary current sensing resistor when an output current of approximately 3,500 milliamps flows through the secondary current sensing resistor. When the output current exceeds 3,500 milliamps, the output of the runtime current comparator switches state and generates a runtime short circuit interrupt (runtime short flag) to the modified control logic 650. The modified control logic can react immediately to the runtime short circuit interrupt to return to the startup sequence as described above.

Because the startup current comparator 1300 and the runtime current comparator 1310 in FIGS. 13A and 13B are implemented as asynchronous comparators rather than as sampling comparators, the comparators are able to detect spikes in the output current that have very short durations.

Figure 14:
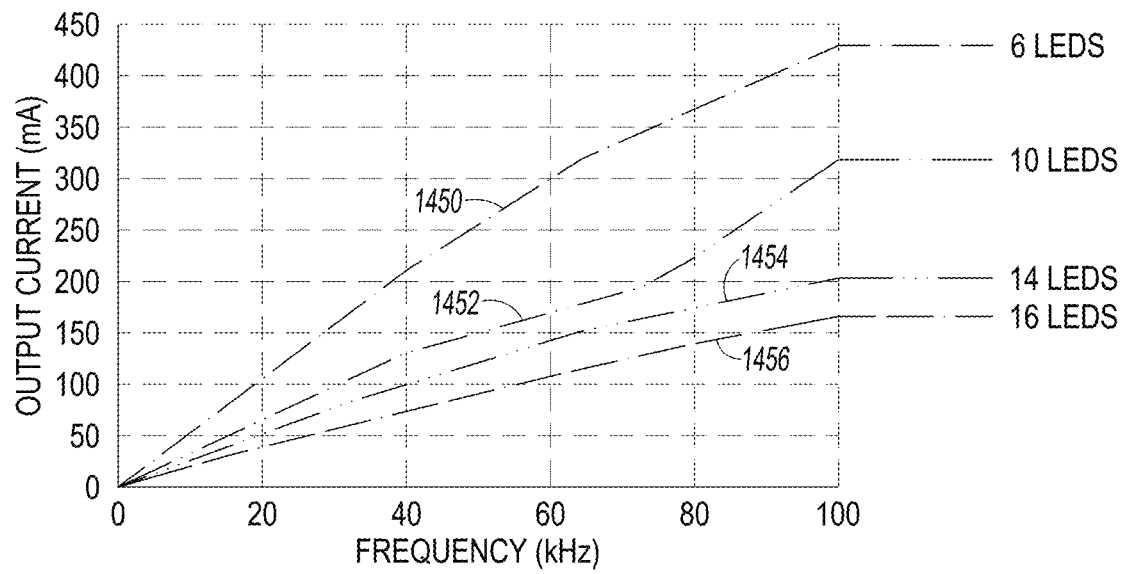
FIG. 14 illustrates graphs of current versus frequency for four LED loads having different numbers of LEDs.

The on-time is fixed when using frequency control. To normalize the frequency response, the fixed on-time is adjusted depending on the characteristics of the LED load 110 being driven. The problem solved by adjusting the fixed on-time is illustrated by the current versus frequency characteristic curves in FIG. 14. A first graph 1450 drawn with a dash-dot line pattern represents the current through a string of 6 LEDs over a range of frequencies. A second graph 1452 drawn with a dash-dot-dot line pattern represents the current through a string of 10 LEDs over the same range of frequencies. A third graph 1454 drawn with a dash-dot-dot-dot line pattern represents the current through a string of 14 LEDs over the same range of frequencies. A fourth graph 1456 drawn with a dash-dash-dot line pattern represents the current through a string of 16 LEDs over the same range of frequencies. Because of the higher output voltage required to drive a larger string of LEDs, a higher current flows through the string of 6 LEDs than flows through the longer strings of LEDs at each frequency. This disparity in the operating frequencies to drive the strings of LEDs to a specific load current complicates control loop design when the modified secondary flyback converter 610 is operating in a discontinuous mode. For example, a fixed gain control loop turned to perform optimally for a string of 6 LEDs would be suboptimal for a string of 16 LEDs; and a fixed gain loop tuned to perform optimally for 16 LEDs would be suboptimal for a string of 6 LEDs.

Figure 15:
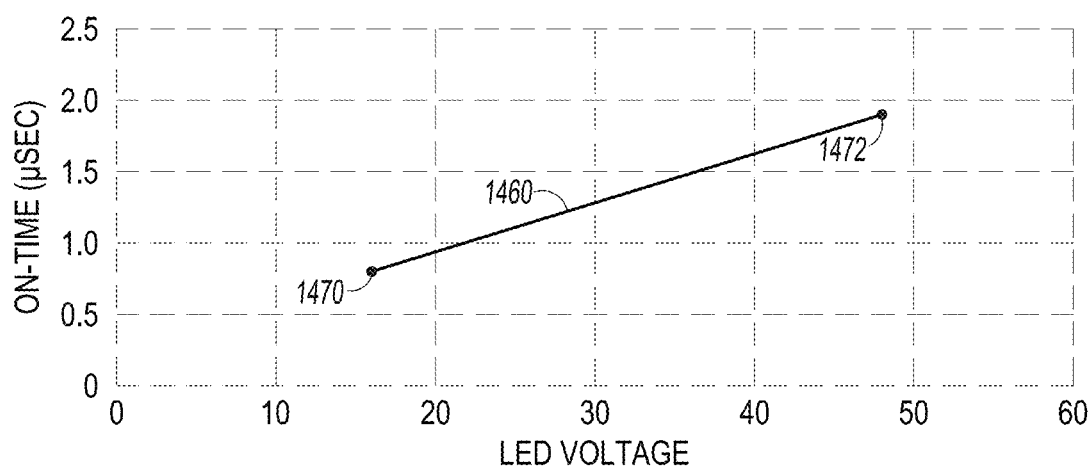
FIG. 15 illustrates a graph of on-time in microseconds versus LED voltage to drive a small amount of LED current (e.g., 10 milliamps) at a fixed frequency for a range of LED loads.

The foregoing can also be understood with respect to FIG. 15, which illustrates a graph 1460 of the on-time required in microseconds required to drive approximately 10 milliamps of current through strings of LEDs at various voltages with the frequency fixed at approximately 3 kHz. A first point 1470 on the graph shows that for an LED voltage of approximately 16 volts, the on-time required to drive 10 milliamps of current through the LEDs is approximately 0.8 microseconds (800 nanoseconds). A voltage of 16 volts is sufficient to drive a string of 6 LEDs. A second point 1472 on the graph shows that for an LED voltage of approximately 48 volts, the on-time required to drive 10 milliamps of current through the LEDs is approximately 1.9 microseconds (1,900 nanoseconds).

The slope and the offset of the graph 1460 of FIG. 15 are used to generate the following Equation (3), which is used to adjust the fixed on-time value (on-time$_{FIXED}$) for the discontinuous control mode based on the measured LED voltage $V_{LED}$ when the LED current is first detected (e.g., when the current is approximately 1 milliamp) as described above:

$$on\_time_{FIXED} = \\ 800nS + \frac{(V_{LED} - 16) \times (1900nS - 800nS)}{(48 - 16)} = \frac{(V_{LED} - 16) \times 1100nS}{32} \quad (3)$$

Equation (3) has limits. If the LED voltage $V_{LED}$ is less than 16 volts, the on-time value on is set for 800 nanoseconds. If the LED voltage is greater than 48 volts, the on-time value is set to 1,900 nanoseconds.

Figure 16:
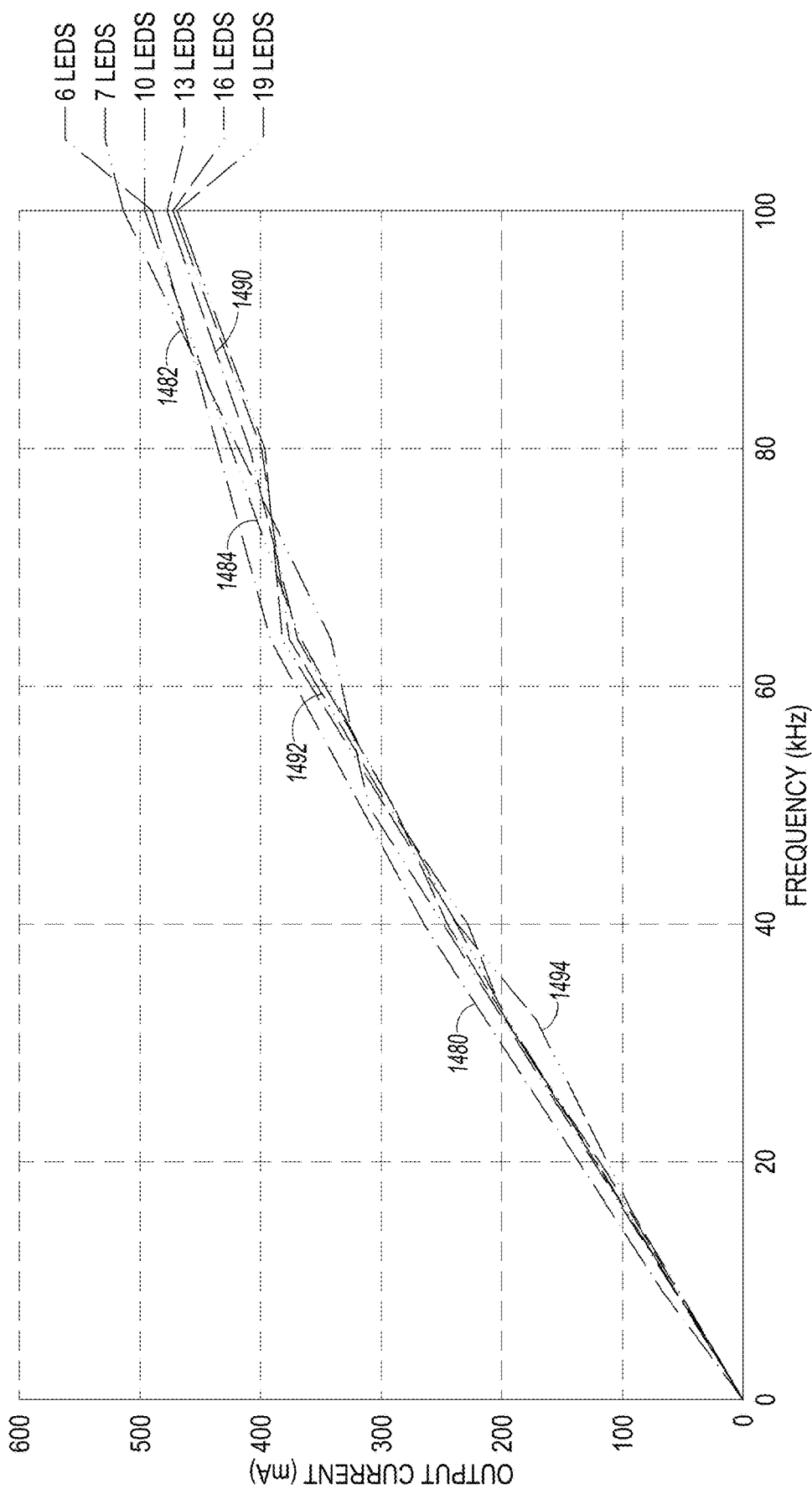
FIG. 16 illustrates graphs of current versus frequency for six LED loads having different numbers of LEDs wherein the fixed on-time for each load is based on the measured LED voltage when the LED current is first detected (e.g., when the LED current is approximately 1 milliamp).

Using Equation (3) to set the fixed on-time for various voltages results in tighter frequency versus LED current graphs as illustrated in FIG. 16. In FIG. 16, a first graph 1480 drawn with a dash-dot line pattern represents the current through a string of 6 LEDs over the same range of frequencies as in FIG. 14. A second graph 1482 drawn with a dash-dot-dot line pattern represents the current through a string of 7 LEDs over the same frequency range. A third graph 1484 drawn with a dash-dot-dot-dot line pattern represents the current through a string of 10 LEDs over the same frequency range. A fourth graph 1490 drawn with a dash-dash-dot line pattern represents the current through a string of 13 LEDs over the same frequency range. A fifth graph 1492 drawn with a dash-dash-dot-dot line pattern represents the current through a string of 16 LEDs over the same frequency range. A sixth graph 1494 drawn with a dash-dash-dot-dot-dot line pattern represents the current through a string of 19 LEDs over the same frequency range.

The fixed on-time adjustment is performed one time during the startup sequence, which may occur as a fresh startup (e.g., after initially powering on the LED driver 600), which may occur when coming out of a dimmed state or a an off/standby state, or which may occur when recovering from a fault. In any case, the on-time adjustment is performed when the LED current is first detected as described above. The one-time adjustment of the on-time facilitates the control loop gain selection because different LED loads will respond the same way to the frequency sweep. This enables tuning of the control loop for one LED load. Other LED loads within the operating range of the LED driver will behave similarly.

Figure 17:
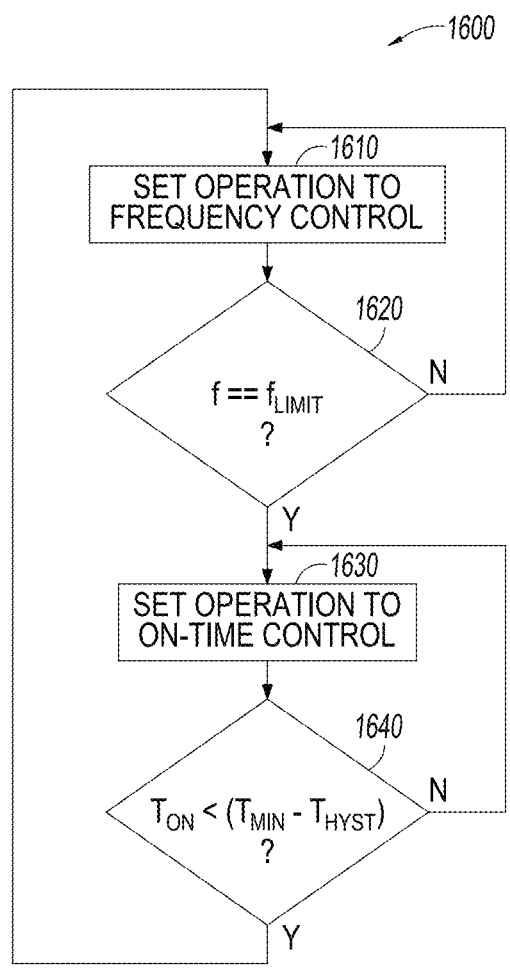
FIG. 17 illustrates a simplified version of a decision-making process of FIG. 11 that controls switching between frequency control and on-time control.

FIG. 17 illustrates a simplified version of a decision-making process 1600 that controls switching between frequency control and on-time control of the gating of the second MOSFET 440 by the modified control logic 650 as was previously described with respect to control loop decision-making process 1000 of FIG. 11. As previously described, the decision-making process runs continuously. In a frequency control procedure block 1610, the process sets the operation to frequency control with a fixed on-time in accordance with the following Equation (4), which sets a new period between gating pulses:

PERIOD$_{NEW}$=PERIOD$_{PREVIOUS}$+
  (PERIOD$_{PREVIOUS}$×a×k$_1$×ERROR)     (4)

In Equation (4), P$_{NEW}$ is the computed new period and P$_{PREVIOUS}$ is the previous period. The error is the difference between the measured LED current and the desired output current to the LEDs as described above with respect to FIG. 11. The value a is a first gain coefficient as described above. The value k$_1$ is a second gain coefficient.

The first gain coefficient α is multiplied by the previous period to attenuate the previous period to an appropriate level. As shown in FIG. 15, the LED current is approximately linear with respect to the gating frequency. Most microcontrollers, such as the modified control logic 650, which generate gating pulses, are controlled with respect to time. Other methods of generating gating pulses are also controlled with respect to time. Using a fraction of the previous period value as gain in the control computation of Equation (4) causes the frequency updates in the period to be linear with respect to frequency. The gain is adaptive by applying more gain at lower frequencies (longer periods) where the period needs to increase or decrease in larger increments to achieve substantial change in the output current. Equation (4) provides less gain at higher frequencies (shorter periods) where less change in the period is needed.

The second gain coefficient k$_1$ is tuned to achieve suitable control loop response. Valley switching is enabled during frequency control once the frequency is sufficiently high that the second MOSFET 440 is gated on before the drain-to-source oscillations of the second MOSFET have dissipated. For example, this can occur at approximately 10 kHz in the illustrated embodiment. As discussed above, valley switching prevents current ripple caused by switching randomly on peaks and valleys. Valley switching can improve efficiency at lower operating points as the second MOSFET is gated on during ringing when the magnitude of the voltage is at a local minimum.

After setting the new frequency in the frequency control procedure block 1610, the decision-making process 1600 advances to a frequency limit checking decision block 1620 wherein the decision-making process determines whether the new frequency is equal to the frequency limit. If the new frequency is not equal to the frequency limit, the decision-making process returns to the frequency control procedure block and computes a new frequency based on any error between the desired current and the sensed current.

If the decision-making process 1600 determines in the frequency limit checking decision block 1620 that the frequency has reached the frequency limit, the decision-making process advances to a set on-time control procedure block 1630 wherein the decision-making process enables on-time control at a fixed frequency. The modified control logic 650 computes a new on-time value in accordance with the following Equation (5):

ON-TIME$_{NEW}$=ON-TIME$_{PREVIOUS}$+
  (ON-TIME$_{PREVIOUS}$×k$_2$×ERROR)     (5)

In Equation (5), the error is determined as previously described. The coefficient k$_2$ is the gain determined for computing the new on-time value.

After computing the new on-time value in the on-time control procedure block 1630, the decision-making process 1600 advances to an on-time minimum checking decision block 1640 wherein the decision-making process determines whether the new on-time value is less than a minimum on-time value T$_{MIN}$ less an on-time hysteresis value T$_{HYST}$. If the new on-time value is not less than the minimum on-time value T$_{MIN}$ less the on-time hysteresis value T$_{HYST}$, the decision-making process returns to the on-time control procedure block to compute a new on-time value. If the new on-time value is less than the minimum on-time value $T_{MIN}$ less the on-time hysteresis value $T_{HYST}$, the decision-making process returns to the frequency control procedure block 1610 and computes a new frequency at a fixed on-time value. The hysteresis value is selected to allow the on-time to vary a selected small amount below the minimum on-time without causing the decision-making process to switch to frequency control.

When operating in on-time control, a maximum frequency/minimum period limit is forced. During on-time control, a valley has to be detected from the valley sense circuit in FIG. 3 and the previous switching period has to be elapsed to gate the second MOSFET 440 on again as described above with respect to FIG. 6. This switching rule ensures that the modified secondary flyback converter 610 will gate the second MOSFET in either discontinuous valley switching mode or in critical conduction mode. When the modified secondary flyback converter first enters into variable on-time control operation, the modified secondary flyback converter will not already be switching on the first valley of the ringing of the drain-to-source voltage of the second MOSFET. As the modified control logic 650 increases the output current towards a maximum output current, the second MOSFET switches on earlier and earlier valleys and works toward the first valley $V_1$. The modified secondary flyback converter can operate in regions where the switching of the second MOSFET dithers between adjacent valleys (e.g., between the valley $V_1$ and the valley $V_2$, between the valley $V_2$ and the valley $V_3$, or the like). Such switching can induce output current ripple as discussed above. One valley dithering (valley jumping) is detected, the dithering is eliminated by adjusting the frequency limit to force gating of the second MOSFET to occur on one valley or the other as described above with respect to FIGS. 7-10.

As previously described, FIG. 11 illustrates another representation of the combined control loops for frequency control and on-time control. FIG. 6 illustrates the combination of the control loop with the one-shot PWM 750 and supporting logic that enforces the gating control rules.

FIGS. 18-21 illustrate advantages of the operation of the modified control logic 650 that implements the startup process 1200, the startup short circuit test process 1210 and the runtime short circuit test process 1220. A respective timescale is provided for each figure with the timescale starting at a time of 0; however, the starting point of each figure is arbitrary. The respective waveforms illustrated in each figure may extend to the left of the illustrated starting point indefinitely. The enumerated times along the respective x-axes should be considered as relative times rather than absolute times.

Figure 18:
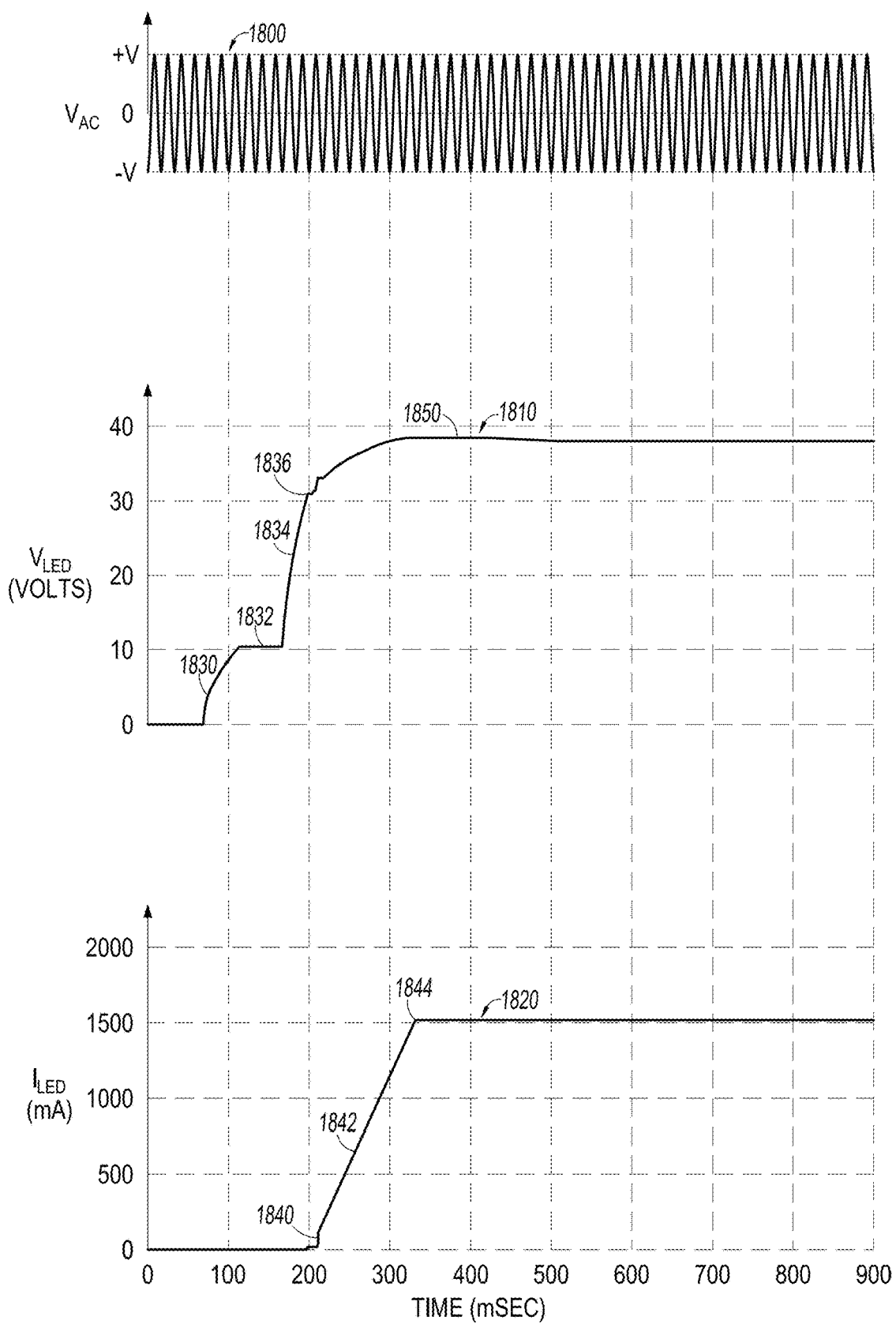
FIG. 18 illustrates waveforms produced by the fast startup sequence described herein wherein an upper waveform represents the AC input, a middle waveform represents the LED voltage $V_{LED}$, and a lower waveform represents the current $I_{LED}$ through the LED load.

FIG. 18 illustrates waveforms produced by the fast startup sequence described herein. An upper waveform 1800 represents the AC input, which in the illustrated embodiment operates at 60 Hz. A middle waveform 1810 in FIG. 18 represents the voltage $V_{LED}$ (also referred to as the output voltage $V_{OUT}$) applied across the LED load 110. A lower waveform 1820 in FIG. 18 represents the current $I_{LED}$ through the LED load.

As represented by the voltage waveform 1810, the LED voltage starts at 0 volts when the AC input is first applied at a time 0. The current through the LED load is 0 milliamps. Approximately 80 milliseconds after the AC input is applied, the LED voltage is increased as the startup process 1200 (FIG. 12A) determines whether the LED voltage rises to more than 5 volts, as represented by a rising voltage transition 1830 to approximately 10 volts. As represented by a constant voltage level 1832, the LED voltage is maintained at approximately 10 volts for approximately 50 milliseconds while the startup process tests for a startup short circuit via the startup short circuit test process 1210 of FIG. 12B. After verifying that a short circuit is not present, the startup process adjusts the on-time and the frequency in the runtime on-time and frequency setting procedure block 1254 (FIG. 12A) to rapidly charge the secondary flyback converter filter capacitor 480 as illustrated by a rapid transition 1834 in the LED voltage. Approximately 50 milliseconds later (approximately 200 milliseconds after the AC input is applied), the voltage reaches a magnitude represented at a location 1836 on the voltage waveform when current is detected through the LED load 110 as represented by an initial transition 1840 in the current waveform 1820 in FIG. 18. The startup process enables the control loop decision-making process 1000 of FIG. 11, and the LED current is ramped up to along a transition 1842 to a maximum current in approximately 120 milliseconds at an inflection point 1844. In the illustrated embodiment, the maximum current is set to approximately 1,500 milliamps at a maximum voltage 1850 on the voltage waveform. As illustrated, the complete startup process from the application of the AC input voltage to full LED current has a duration of approximately 340 milliseconds.

FIG. 19 illustrates the problems solved by implementing the voltage-based adjustment of the fixed on-time using Equation (3) and by implementing the frequency-adaptive gain of Equation (4). For convenience in referencing the equations, both equations are reproduced below:

$$on\_time_{FIXED} = 800nS + \frac{(V_{LED} - 16) \times (1900nS - 800nS)}{(48 - 16)} = \frac{(V_{LED} - 16) \times 1100nS}{32} \quad (3)$$

$$PERIOD_{NEW} = PERIOD_{PREVIOUS} + (PERIOD_{PREVIOUS} \times a \times k_1 \times ERROR) \quad (4)$$

In FIG. 19, the features implemented in accordance with Equation (3) and Equation (4) are disabled to show the effect of not having the improvements. In FIG. 19, an uppermost waveform 1900 represents the dimming control input on the first input terminal 454 of the modified control logic 650. A middle waveform 1910 represents the LED voltage $V_{LED}$. A lowermost waveform 1920 represents the output current $I_{LED}$ through the LEDs. All the magnitudes are at respective 0 values at a time 0. The dimmer control input transitions from 0 to a higher voltage level as illustrated by a rising voltage level 1932 from an inflection point 1930 to a constant voltage level 1934 of the dimmer control waveform 1900. For example, the constant voltage level is selected to correspond to an output current level of approximately 28 milliamperes. Sometime later (approximately 160 milliseconds in the illustrated waveforms), the LED voltage begins transitioning to higher voltages from an inflection point 1940 along a rising waveform portion 1942 to a steady-state voltage level 1944. At an initial threshold voltage level 1946 below the steady-state voltage level, the voltage is sufficient to cause the modified secondary flyback converter 610 to start producing output current through the LED load 110 as represented by a small non-zero output current blip 1950. A few milliseconds later (e.g., approximately 60 milliseconds later), the output current starts flowing through the LED load as represented by a rapid transition 1952 to a peak 1954 in the current waveform 1920. The peak represents a significant overshoot in the magnitude of the output current, which is followed by smaller, but still significant, overshoots 1956 before the output current settles out to a steady-state magnitude 1956 of approximately 28 milliamperes.

FIG. 20 represents a dimming control input waveform 2000, an LED voltage waveform 2010 and an output current waveform 2020 as represented in FIG. 19; however, in FIG. 20, the LED voltage waveform and the output current waveform illustrate the effect of enabling the voltage-adjusted on-time control and the frequency adaptive gain control during a rapid power-off-on sequence such as may occur when switching the LED driver 600 to standby and then switching the LED driver back on. The sequence does not include the startup short circuit test 1210 (FIG. 12B) because the LED driver has previously been tested for a short circuit. In FIG. 20, after a transition 2030 of the dimming control input, the LED voltage increases smoothly along a rising transition 2040 from 0 volts to a steady-state voltage level 2042. When the magnitude of the LED voltage is just below the steady-state voltage, the output current through the LED load 110 begins to increase smoothly along a transition 2050 to a steady-state current level 2052. As described above, the startup process implemented by the modified control logic 650 prevents the output current from spiking or otherwise overshooting the desired output current.

FIG. 21 illustrates waveforms that occur when an output short circuit occurs during the startup process. An uppermost waveform 2100 represents the LED voltage $V_{LED}$. A middle waveform 2110 represents the gating voltage applied to the second MOSFET 440 by the modified control logic 650. A lowermost waveform 2120 represents the output current $I_{LED}$ through the LED load 110. The LED voltage remains at 0 volts because the output circuit is shorted. The gating voltage waveform comprises a plurality of pulses 2130, which are periodically applied to the second MOSFET. Although the pulses appear as spikes in FIG. 21, each pulse has a width corresponding to the on-time (e.g., 800 nanoseconds) selected at the beginning of the startup process 1200 (FIG. 12A). The gating pulses are periodic at the selected gating frequency. For example, at a gating frequency of 3 kHz, the gating pulses have a period of approximately 333 microseconds. Each time the second MOSFET is gated on, the secondary flyback converter filter capacitor 480 is charged and the resulting charge causes a current to flow through the output short circuit as a corresponding periodic series of current pulses 2140 in the current waveform 2120. The current is limited to less than 600 milliamps, which is a safe level for the second MOSFET to continue switching until the short circuit is removed.

FIG. 22 illustrates the detection of a current spike during runtime. In FIG. 22, an uppermost waveform 2200 represents a plurality of gating pulses 2202 applied to the second MOSFET 440 at a frequency of approximately 85 kHz and an on-time of approximately 5 microseconds. A middle waveform 2210 represents the LED voltage $V_{LED}$, which has an initial magnitude of approximately 51 volts. At a time of 100 microseconds, for example, the output circuit (e.g., the LED load 110) is shorted such that the LED voltage drops along a step transition 2212 to a level 2214 of 0 volts. A lowermost waveform 2220 represents the output current through the LED load 110. The output current has an initial steady-state level 2222 at a magnitude of a few amps (e.g., approximately 1.5 amps in the illustrated embodiment). When the short circuit occurs, the output current increases rapidly along a transition 2224 to a peak 2226. This rapid increase in current is detected by the runtime short circuit test process 1220, which causes the modified control logic 650 to cease generating the gating pulses to the second MOSFET as represented by the constant 0 volts level of the gating waveform 2200. As illustrated, the gating stops within one switching cycle of the detection of the rapid increase in current caused by the runtime short circuit. When the gating pulses cease, the current pulse begins decreasing as represented by a transition 2228. No further current pulses are generated because of the cessation of the gating pulses.

As described herein, the LED driver 600 is based on a double flyback topology wherein the primary section is isolated from the secondary section. Within the secondary section, the modified secondary flyback converter 610 is non-isolated with respect to the LED load 110, which allows ground sharing between the second MOSFET 440 and the LED load. This ground sharing simplifies the modified control logic circuit 650 and allows the gate driver for the second MOSFET to be directly referenced to the secondary ground reference 180. The modified control logic circuit within the modified secondary flyback converter utilizes valley switching with dv/dt sensing to achieve high LED current control stability in a discontinuous frequency on-time control mode. The modified control logic circuit implements dynamic switching frequency limit adjustment to prevent valley jumping of the gating signal for the second MOSFET, which also contributes to the achievement of high LED current control stability in a discontinuous frequency on-time control mode. The modified control logic circuit utilizes first valley switching of the second MOSFET to achieve high efficiency in a quasi-resonant on-time control mode. The LED driver maintains a low standby power by setting the bulk voltage $V_{BULK}$ at a low level.

At startup, the LED driver 600 sets the on-time and the frequency at low values to test short circuit abnormal conditions without risking damage to the second MOSFET 440. The LED driver dynamically sets the on-time and the frequency during the startup process 1200 to speed up the startup process. Dynamically setting the on-time and the frequency enables smooth ramping up of the output current from 0 to a maximum current with minimum turn-on current overshoot and with no startup flash. The maximum switching frequency is limited to reduce switching losses and to improve efficiency. The LED driver maintains low frequency ripple (e.g., ripple at less than 120 Hz) of the output current at less than 5 percent by setting the control loop crossover frequency greater than 1 kHz. The LED driver operates in the critical conduction mode at full power to improve the power density and the efficiency.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A two-stage driver for supplying current to a light-emitting diode (LED) load, the two-stage driver comprising:
 a first stage having a first flyback converter, the first flyback converter including a first flyback transformer having a primary winding referenced to a primary ground reference, a secondary winding referenced to a secondary ground reference, the first stage configured to receive a non-regulated voltage input and to generate a substantially constant bulk voltage across a first-stage output filter capacitor, the substantially constant bulk voltage referenced to the secondary ground reference;
 an electrically isolated second stage having a second flyback converter, the second stage configured to receive the bulk voltage from the first stage, the second stage further configured to generate a desired current through an output circuit including the LED load, the second flyback converter having a second flyback transformer having a respective primary winding and a respective secondary winding, the respective primary winding driven by a semiconductor switch, the semiconductor switch driven by a gating signal having a variable on-time and having a variable switching frequency and a corresponding variable switching cycle, the respective primary winding of the second flyback transformer charged during the on-time, the respective secondary winding discharging after the on-time of the gating signal driving the semiconductor switch, the discharging of the respective secondary winding generating a respective secondary voltage to the output circuit; and control logic configured to sense a change from an off condition to an on condition and to initiate a startup cycle, the control logic configured to adjust the gating signal to have a first startup on-time and a first startup frequency, the control logic further configured to measure an output voltage across the output circuit to detect an increase in the output voltage, thereby confirming that the output circuit is not shorted, the control logic further configured to adjust the gating signal to have a second on-time and a second frequency to generate an increasing output voltage across the output circuit, the control logic further configured to detect a current through the LED and a voltage across the output circuit, the control logic responsive to the detected current and the LED voltage to further adjust the on-time and the frequency of the gating signal to enable sufficient current to flow through the LED load to cause the LED load to illuminate.

2. The two-stage driver as defined in claim 1, wherein:
the control logic is further configured to enable a runtime short circuit test after adjusting the gating signal to have the second on-time and the second frequency to confirm that the current through the LED load does not exceed a threshold current level; and
the control logic is configured to enable the runtime short circuit test as a background process while the LED load is illuminated.

3. The two-stage driver as defined in claim 1, wherein:
the respective secondary winding generates a ringing voltage after the respective secondary winding current is discharged, the ringing voltage having a ringing period comprising alternating minima (valleys) and maxima (peaks);
the second flyback converter includes a valley sense circuit, the valley sense circuit configured to generate an active valley sense output signal in response to detection of each minimum during the ringing of the respective secondary voltage; and
the control logic is further configured to sense the active valley sense output signal and to control the gating signal to turn on the semiconductor switch when the valley sense output signal is active, the control logic further configured to sense a valley jump indicator when the gating signal is turned on in different valleys in subsequent cycles, the control logic responsive to the valley jump indicator to adjust a maximum switching frequency limit of the gating signal.

4. The two-stage driver as defined in claim 3, wherein the second flyback converter includes:
a counter within the control logic that determines a first elapsed time between a beginning of a first switching cycle and a beginning of second switching cycle, and that determines a second elapsed time between the beginning of the second switching cycle and a beginning of a third switching cycle; and
a comparator within the control logic that compares a difference between the first elapsed time and the second elapsed time with a threshold value, the comparator generating the valley jump indicator when the difference exceeds the threshold value.

5. The two-stage driver as defined in claim 4, wherein the second flyback converter includes a frequency limit adjustment routine within the control logic, the frequency limit adjustment routine responsive to the valley jump indicator to generate an adjusted maximum frequency limit of the variable frequency of the gating signal, the control logic responsive to the adjusted maximum frequency limit to generate the gating signal with a frequency no greater than the adjusted maximum frequency limit.

6. The two-stage driver as defined in claim 5, wherein:
the first elapsed time corresponds to a first switching frequency f[0] and the second elapsed time corresponds to a second switching frequency f[1]; and
the frequency adjustment routine is configured to provide a base frequency limit in a first state;
the frequency adjustment routine is configured to provide a modified frequency limit in a second state, wherein the modified frequency limit is an average of the first switching frequency f[0] and the second switching frequency f[1];
when in the first state, the frequency adjustment routine is configured to advance to the second state on an occurrence of the valley jump indicator and to change the maximum frequency limit from the base frequency limit to the modified frequency limit; and
when in the second state, the frequency adjustment routine is configured to advance to the first state on an occurrence of the valley jump indicator and to change the maximum frequency limit from the modified frequency limit to the base frequency limit.

7. The two-stage driver as defined in claim 5, wherein:
the frequency adjustment routine is configured to provide a base maximum frequency limit in a first state;
the frequency adjustment routine is configured to provide a first different frequency limit in a second state;
the frequency adjustment routine is configured to provide a second different frequency limit in a third state;
when in the first state, the frequency adjustment routine is configured to advance to the second state on an occurrence of the valley jump indicator and to change the maximum switching frequency limit from the base maximum frequency limit to the first different frequency limit;
when in the second state, the frequency adjustment routine is configured to advance to the third state on an occurrence of the valley jump indicator and to change the maximum switching frequency limit from the first different frequency limit to the second different frequency limit; and
when in the third state, the frequency adjustment routine is configured to advance to the first state on an occurrence of the valley jump indicator and to change the maximum switching frequency limit from the second different frequency limit to the base maximum frequency limit.

8. A method of controlling the current through light-emitting diodes (LEDs) comprising:
- generating a bulk DC voltage from an input source using a first flyback converter stage having a first flyback transformer, the first flyback transformer having a first primary winding referenced to a primary ground reference, the first flyback transformer having a secondary winding referenced to a secondary ground reference, the secondary ground reference isolated from the primary ground reference;
- converting the bulk DC voltage to a controlled current through the LEDs using a second flyback converter having a second flyback transformer, the second flyback transformer having a respective primary winding and a respective secondary winding, the respective primary winding driven by a semiconductor switch referenced to the secondary ground reference;
- controlling the semiconductor switch with a gating signal to cause the semiconductor switch to have an on-time with a controllable duration, the on-time repeating with a controllable switching period having a corresponding switching frequency, the primary winding of the second flyback transformer charging with current during the on-time of the semiconductor switch, the second flyback transformer discharging current through the respective secondary winding after the duration of the on-time to generate a secondary voltage across an output circuit; and
- sensing a change from an off condition to an on condition and initiating a startup cycle;
- adjusting the gating signal to have a first startup on-time and a first startup frequency;
- measuring an output voltage across the output circuit to detect an increase in the output voltage, thereby confirming that the output circuit is not shorted; and
- if the output voltage increases:
  - adjusting the gating signal to have a second on-time and a second frequency to further increase the output voltage across the output circuit;
  - detecting a current through the LED load and determining a magnitude of the output voltage; and
  - further adjusting the on-time and the frequency of the gating signal in response to the detected current and the magnitude of the output voltage to enable sufficient current to flow through the LED load to cause the LED load to illuminate.

9. The method as defined in claim 8, further comprising:
- enabling a runtime short circuit test after adjusting the gating signal to have the second on-time and the second frequency to confirm that the current through the LED load does not exceed a threshold current level; and
- continuing the runtime short circuit test as a background process while the LED load is illuminated.

10. The method as defined in claim 8, wherein the secondary voltage rings with a plurality of alternating minima (valleys) and maxima (peaks) when the secondary current is discharged, the method further including:
- detecting the valleys in the ringing of the secondary voltage;
- switching the semiconductor switch on during a detected valley;
- detecting when the semiconductor switch is turned on during a different valley in subsequent switching period; and
- adjusting the controllable switching period.

11. The method as defined in claim 10, further comprising:
- determining a first elapsed time between a beginning of a first switching period and a beginning of second switching period;
- determining a second elapsed time between the beginning of the second switching period and a beginning of a third switching period;
- comparing a difference between the first elapsed time and the second elapsed time with a threshold value; and
- generating the valley jump indicator when the difference exceeds the threshold value.

12. The method as defined in claim 11, further comprising:
- generating an adjusted maximum frequency limit of the gating signal; and
- generating the gating signal with a frequency no greater than the adjusted maximum frequency limit.

13. The method as defined in claim 12, further comprising:
- providing a first switching frequency f[0] corresponding to the first elapsed time;
- providing a second switching frequency f[1] corresponding to the second elapsed time;
- providing a base frequency limit in a first state;
- providing a modified frequency limit in a second state, wherein the modified frequency limit is an average of the first switching frequency f[0] and the second switching frequency f[1];
- on an occurrence of the valley jump signal when in the first state, advancing to the second state and changing the maximum frequency limit from the base frequency limit to the modified frequency limit;
- on an occurrence of the valley jump signal when in the second state, advancing to the first state and changing the maximum frequency limit from the modified frequency limit to the base frequency limit.

14. The method as defined in claim 12, further comprising:
- providing a base maximum frequency limit in a first state;
- providing a first different frequency limit in a second state;
- providing a second different frequency limit in a third state;
- on an occurrence of the valley jump signal when in the first state, advancing to the second state and changing the maximum switching frequency limit from the base maximum frequency limit to the first different frequency limit;
- on an occurrence of the valley jump signal when in the second state, advancing to the third state and changing the maximum switching frequency limit from the first different frequency limit to the second different frequency limit; and
- on an occurrence of the valley jump signal when in the third state, advancing to the first state and changing the maximum switching frequency limit from the second different frequency limit to the base maximum frequency limit.

* * * * *